(12) United States Patent
Watson et al.

(10) Patent No.: US 7,698,036 B2
(45) Date of Patent: Apr. 13, 2010

(54) VEHICLE ROLLOVER DETECTION SYSTEM

(75) Inventors: W. Todd Watson, Belleville, MI (US); Leonard S. Cech, Brighton, MI (US)

(73) Assignee: Automotive Systems Laboratory, Inc., Farmington Hills, MI (US)

( * ) Notice: Subject to any disclaimer, the term of this patent is extended or adjusted under 35 U.S.C. 154(b) by 376 days.

(21) Appl. No.: 10/392,072

(22) Filed: Mar. 19, 2003

(65) Prior Publication Data

US 2003/0182042 A1    Sep. 25, 2003

Related U.S. Application Data

(60) Provisional application No. 60/366,149, filed on Mar. 19, 2002.

(51) Int. Cl.
*B60R 21/16* (2006.01)
(52) U.S. Cl. .................. 701/45; 280/734; 280/5.506; 280/5.507
(58) Field of Classification Search ............. 701/45; 180/271, 282, 197; 280/735, 734, 743.1, 280/5.506, 5.508, 5.507, 802, 5.51; 340/429; *B60T 21/16*
See application file for complete search history.

(56) References Cited

U.S. PATENT DOCUMENTS

| | | | |
|---|---|---|---|
| 3,719,248 A | 3/1973 | Bott ........................... 180/103 |
| 3,899,028 A | 8/1975 | Morris et al. ................. 172/4.5 |
| 4,038,876 A | 8/1977 | Morris ......................... 73/432 |
| 4,470,124 A | 9/1984 | Tagami et al. ................ 364/671 |
| 4,592,565 A | 6/1986 | Eagle .......................... 280/432 |
| 4,691,798 A | 9/1987 | Engelbach ................... 180/209 |
| 5,065,612 A | 11/1991 | Ooka et al. ....................... 73/1 |
| 5,071,160 A | 12/1991 | White et al. ................. 280/735 |
| 5,074,583 A | 12/1991 | Fujita et al. ................. 280/735 |
| 5,115,238 A | 5/1992 | Shimizu et al. ............. 340/988 |
| 5,118,134 A | 6/1992 | Mattes et al. ................ 280/735 |
| 5,125,472 A | 6/1992 | Hara ........................... 180/271 |
| 5,172,323 A | 12/1992 | Schmidt ...................... 364/453 |
| 5,203,600 A | 4/1993 | Watanabe et al. ........... 296/68.1 |
| 5,218,771 A | 6/1993 | Redford ........................ 33/366 |
| 5,233,213 A | 8/1993 | Marek ......................... 257/415 |
| 5,261,506 A | 11/1993 | Jost .............................. 180/282 |
| 5,270,959 A | 12/1993 | Matsuzaki et al. ..... 364/571.02 |
| 5,337,238 A | 8/1994 | Gioutsos et al. ........ 364/424.03 |

(Continued)

FOREIGN PATENT DOCUMENTS

DE         19955559 A1    6/2000

(Continued)

OTHER PUBLICATIONS

U.S. Appl. No. 10/391,943, W. Todd Watson, *Vehicle Rollover Detection System*, Filed on Mar. 19, 2003.

(Continued)

*Primary Examiner*—Tuan C To
(74) *Attorney, Agent, or Firm*—Raggio & Dinnin, P.C.

(57) ABSTRACT

A roll angular velocity sensor and an occupant sensor are operatively coupled to a processor, which provides for detecting a rollover condition responsive to a measure of roll angular velocity and controlling a safety restraint system responsive thereto, wherein a detection criteria associated with the rollover detection process is responsive to a signal from the occupant sensor. In one embodiment, a closure time is estimated from estimates or measurements of occupant velocity or acceleration, and the estimated closure time is compared with a threshold. If the estimated closure time is less than the threshold, activation of the safety restraint system is either inhibited or advanced relative to that otherwise provided by the rollover detection process alone. Otherwise, the activation may be delayed to provide additional time for the rollover detection.

23 Claims, 15 Drawing Sheets

U.S. PATENT DOCUMENTS

| | | | |
|---|---|---|---|
| 5,359,515 A | 10/1994 | Weller et al. | 364/424.05 |
| 5,363,302 A | 11/1994 | Allen et al. | 364/424.05 |
| 5,366,241 A | 11/1994 | Kithil | |
| 5,369,580 A | 11/1994 | Monji et al. | 364/424.01 |
| 5,375,336 A | 12/1994 | Nakamura | 33/324 |
| 5,413,378 A | 5/1995 | Steffens, Jr. et al. | 260/735 |
| 5,451,094 A | 9/1995 | Templin et al. | 297/216.17 |
| 5,492,368 A | 2/1996 | Pywell et al. | 260/806 |
| 5,508,918 A | 4/1996 | Gioutsos | 364/424.05 |
| 5,573,269 A | 11/1996 | Gentry et al. | 280/735 |
| 5,590,736 A | 1/1997 | Morris et al. | 180/282 |
| 5,602,734 A | 2/1997 | Kithil | 364/424.055 |
| 5,610,575 A | 3/1997 | Gioutsos | 340/429 |
| 5,626,359 A | 5/1997 | Steffens, Jr. et al. | 280/735 |
| 5,646,454 A | 7/1997 | Mattes et al. | 307/10.1 |
| 5,670,853 A | 9/1997 | Bauer | 318/286 |
| 5,673,932 A | 10/1997 | Nitschke et al. | 280/735 |
| 5,684,336 A | 11/1997 | McCurdy | 307/10.1 |
| 5,684,701 A | 11/1997 | Breed | 364/424.055 |
| 5,699,256 A | 12/1997 | Shibuya et al. | 364/453 |
| 5,742,916 A | 4/1998 | Bischoff et al. | 701/45 |
| 5,755,978 A | 5/1998 | Newell et al. | 216/33 |
| 5,796,002 A | 8/1998 | Layton | 73/504.15 |
| 5,802,479 A | 9/1998 | Kithil et al. | |
| 5,825,284 A * | 10/1998 | Dunwoody et al. | 340/440 |
| 5,864,768 A | 1/1999 | Bieber et al. | 701/38 |
| 5,890,084 A * | 3/1999 | Halasz et al. | 701/45 |
| 5,948,027 A | 9/1999 | Oliver, Jr. et al. | 701/37 |
| 5,948,028 A | 9/1999 | Raad et al. | 701/37 |
| 5,977,653 A | 11/1999 | Schmid et al. | 307/10.1 |
| 6,002,974 A | 12/1999 | Schiffmann | 701/36 |
| 6,002,975 A * | 12/1999 | Schiffmann et al. | 701/45 |
| 6,014,602 A | 1/2000 | Kithil et al. | |
| 6,018,693 A | 1/2000 | Blackburn et al. | 701/45 |
| 6,031,484 A * | 2/2000 | Bullinger et al. | 342/72 |
| 6,036,225 A | 3/2000 | Foo et al. | 280/735 |
| 6,038,495 A * | 3/2000 | Schiffmann | 701/1 |
| 6,047,229 A | 4/2000 | Ishikawa | 701/50.414 |
| 6,055,472 A | 4/2000 | Breunig et al. | 701/45 |
| 6,065,558 A | 5/2000 | Wielenga | 180/282 |
| 6,070,681 A * | 6/2000 | Catanzarite et al. | 180/89.15 |
| 6,076,027 A | 6/2000 | Raad et al. | 701/38 |
| 6,095,554 A | 8/2000 | Foo et al. | 280/735 |
| 6,104,284 A | 8/2000 | Otsuka | 340/440 |
| 6,113,138 A | 9/2000 | Hermann et al. | 280/735 |
| 6,141,604 A | 10/2000 | Mattes et al. | 701/1 |
| 6,154,697 A | 11/2000 | Otsuka | 701/45 |
| 6,157,295 A | 12/2000 | Steiner et al. | 340/440 |
| 6,169,946 B1 | 1/2001 | Griessbach | 701/45 |
| 6,170,594 B1 | 1/2001 | Gilbert | 180/282 |
| 6,186,539 B1 | 2/2001 | Foo et al. | 280/735 |
| 6,192,305 B1 * | 2/2001 | Schiffmann | 701/45 |
| 6,199,902 B1 | 3/2001 | Cooper et al. | 280/735 |
| 6,212,455 B1 | 4/2001 | Weaver | 701/45 |
| 6,213,512 B1 * | 4/2001 | Swann et al. | 280/806 |
| 6,225,894 B1 | 5/2001 | Kyrtsos | 340/440 |
| 6,255,939 B1 | 7/2001 | Roth et al. | 340/425.5 |
| 6,259,042 B1 * | 7/2001 | David | 177/136 |
| 6,259,982 B1 | 7/2001 | Williams et al. | 701/38 |
| 6,262,658 B1 | 7/2001 | O'Connor | 340/440 |
| 6,263,261 B1 | 7/2001 | Brown et al. | 701/1 |
| 6,263,271 B1 | 7/2001 | Oka et al. | 701/45 |
| 6,264,212 B1 | 7/2001 | Timoney | 280/5.51 |
| 6,282,474 B1 * | 8/2001 | Chou et al. | 701/45 |
| 6,292,759 B1 | 9/2001 | Schiffmann | 702/151 |
| 6,301,536 B1 | 10/2001 | Vaessen et al. | 701/45 |
| 6,302,439 B1 | 10/2001 | McCurdy | 280/735 |
| 6,305,711 B1 | 10/2001 | Steffens, Jr. et al. | 280/777 |
| 6,311,112 B1 | 10/2001 | Mazur et al. | 701/45 |
| 6,315,074 B1 | 11/2001 | Achhammer et al. | 180/282 |
| 6,332,104 B1 | 12/2001 | Brown et al. | 701/1 |
| 6,341,252 B1 | 1/2002 | Foo et al. | 701/45 |
| 6,390,498 B1 | 5/2002 | Francis et al. | 280/735 |
| 6,421,592 B1 | 7/2002 | Bargman et al. | 701/45 |
| 6,438,463 B1 | 8/2002 | Tobaru et al. | 701/1 |
| 6,484,080 B2 * | 11/2002 | Breed | 701/36 |
| 6,529,811 B2 | 3/2003 | Watson et al. | 701/45 |
| 6,535,800 B2 * | 3/2003 | Wallner | 701/1 |
| 6,542,792 B2 * | 4/2003 | Schubert et al. | 701/1 |
| 6,560,519 B2 * | 5/2003 | Williams et al. | 701/45 |
| 6,618,655 B2 | 9/2003 | Tobaru et al. | |
| 6,650,981 B2 | 11/2003 | Sekizuka et al. | |
| 2001/0029438 A1 | 10/2001 | Tobaru et al. | 702/151 |
| 2001/0038202 A1 | 11/2001 | Tobaru et al. | 280/805 |
| 2001/0048215 A1 | 12/2001 | Breed et al. | 280/728.1 |
| 2002/0019719 A1 * | 2/2002 | Kueblbeck et al. | 702/147 |
| 2002/0087235 A1 * | 7/2002 | Aga et al. | 701/1 |
| 2002/0087243 A1 * | 7/2002 | Sekizuka et al. | 701/45 |
| 2002/0166710 A1 | 11/2002 | Breed | 180/282 |
| 2002/0173882 A1 | 11/2002 | Tobaru et al. | 701/1 |
| 2003/0158633 A1 * | 8/2003 | Schubert | 701/1 |
| 2005/0109075 A1 | 5/2005 | Kithil et al. | |
| 2006/0241834 A1 | 10/2006 | Kithil | |
| 2007/0277622 A1 | 12/2007 | Kithil et al. | |

FOREIGN PATENT DOCUMENTS

| | | |
|---|---|---|
| GB | 2339047 A | 1/2000 |
| GB | 2343977 A | 4/2000 |
| JP | 05-317668 | 6/1995 |
| JP | 07-164985 | 6/1995 |
| JP | 2001-260780 A | 9/2001 |
| JP | 2001-264352 A | 9/2001 |
| JP | 2001-260802 A | 11/2008 |
| WO | 9609193 A1 | 3/1996 |
| WO | 96009193 A | 3/1996 |
| WO | 9735738 | 10/1997 |

OTHER PUBLICATIONS

"Gyrostar Piezoelectric Vibrating Gyroscope," ENV-05H-02 Series, Murata.

Z. Zurong and S. Cunli, "Principle and Application of a QCW-1A Controllability-Stability Tester for Automobiles," SAE Paper #931973, Seventh International Pacific Conference and Exposition on Automotive Engineering, Phoenix, Arizona, Nov. 15-19, 1993.

A. G. Nalecz; A.C. Bindermann: and C. Bare, "Sensitivity Analysis of Vehicle Tripped Rollover Model", Report DOT HS 807 300, NHTSA, Jul. 1988.

W.R. Garrott, "Rollover Research Activities at the Vehicle Research and Test Center—Frequency Response Testing", Report DOT HS 807 993, NHTSA, Jun. 1992.

W.R. Garrott; J.G. Howe; and G. Forkenbrock, "An Experimental Examination of Selected Maneuvers That May Induce On-Road Untripped, Light Vehicle Rollover—Phase II of NHTSA's 199701998 Vehicle Rollover Research Program", Report VRTC-86-0421, NHTSA, Jul. 1999.

PCT International Search Report in International Application No. PCT/US03/08319.3 pages (International counterpart to U.S. Appl. No. 10/392,072).

Office Action from Japanese Patent Office in respect of counterpart Japanese Patent Application No. 2003-583878, Apr. 22, 2008, 7 pp.

Front Page of and List of patent family members for Publication 1 referred to in Apr. 22, 2008 Office Action from Japanese Patent Office (NPL-1) corresponding to US 6,618,655 B1, 2 pp.

Front Page of and List of patent family members for Publication 2 referred to in Apr. 22, 2008 Office Action from Japanese Patent Office (NPL-1) corresponding to WO96/09193, 4 pp.

Front Page of and List of patent family members for Publication 3 referred to in Apr. 22, 2008 Office Action from Japanese Patent Office (NPL-1) corresponding to WO97/35738, 4 pp.

Front Page of Publication 4 referred to in Apr. 22, 2008 Office Action from Japanese Patent Office (NPL-1), 1 p.

Front Page and List of patent family members for Publication 5 referred to in Apr. 22, 2008 Office Action from Japanese Patent Office (NPL-1) corresponding to US 6,618,655 B1, 2 pp.

Supplemental European Search Report in European Application No. 03711637.3, Aug. 4, 2009, 3 pp.

Phen R. L. Et Al: "Advanced Air Bag Technology Assemssment —Final Report" Jet Propulsion Lab Progress Report, XX, XX, Apr. 1, 1998, XP002137509.

* cited by examiner

Fig. 8a

| ONGOING_EVENT_FLAG (302) | MEASURES ALGORITHM (xxx.1) ONGOING_MEASURES_EVENT_FLAG | ENERGY ALGORITHM (xxx.2) ONGOING_ENERGY_EVENT_FLAG |
|---|---|---|
| Entrance Criteria (306) | $\left|\tilde{A}_y(t) - \tilde{A}_y^{Offset}(t)\right| > A_y^{Thr\_1}$ | a. $\left|\tilde{A}_y(t) - \tilde{A}_y^{Offset}(t)\right| > A_y^{Thr\_1}$ OR <br> b. $\left|\tilde{\omega}_x(t) - \tilde{\omega}_x^{Offset}(t)\right| > \omega_x^{Thr\_1}$ |
| Exit Criteria (322) | $\Delta t^M(n^M) > \Delta t_{max}^M$ | a. $\Delta t^E(n^E) > \Delta t_{max}^E$ OR <br> b1. $\Delta t^E(n^E) > \Delta t_{min}^E$ AND <br> b2. $\Delta t^E(n^E) - \Delta t^{E^*} > \Delta t_{Event}^E$ |
| Algorithm Initialization (310) | a. $n^M = 0$ <br> b. $t^M(-1) = t^M(0) = t$ <br> c. $\Delta t^M(0) = 0$ <br> d. $\theta^M(-1) = 0$ <br> e. $R(-1) = 0$ | a. $n^E = 0$ <br> b. $t^E(-1) = t^E(0) = t$ <br> c. $\Delta t^E(0) = 0$ <br> d. $\theta^E(-1) = 0$ <br> e. $n_\omega^E = 0$ <br> f. $\Delta t^{E^*} = 0$ |
| Measure of Time (312) | a. $n^M$++ <br> b. $t^M(n^M) = t$ <br> c. Time since algorithm entrance <br> $\Delta t^M(n^M) = t^M(n^M) - t^M(0)$ | a. $n^E$++ <br> b. $t^E(n^E) = t$ <br> c. Time since algorithm entrance <br> $\Delta t^E(n^E) = t^E(n^E) - t^E(0)$ |
| Safing Criteria (200) | a. $\left|\tilde{A}_y(t) - \tilde{A}_y^{Offset}(t)\right| > A_y^{Thr\_3}$ for any t during either a Measures Event or an Energy Event (ACCELERATION_SAFING_EVENT_FLAG) AND <br> b. $\left|\tilde{\omega}_x(t) - \tilde{\omega}_x^{Offset}(t)\right| > \omega_x^{Thr\_3}$ for any t during either a Measures Event or an Energy Event (ROLL_SAFING_EVENT_FLAG) | |

Fig. 8b

| | MEASURES ALGORITHM (xxx.1) | ENERGY ALGORITHM (xxx.2) |
|---|---|---|
| Algorithm Calculations (326) | a. Sample interval<br>$dt = t^M(n^M) - t^M(n^M - 1)$<br><br>b. Acceleration sampling and offset compensation<br>$\tilde{A}'_y(n^M) = \tilde{A}_y(t) - \tilde{A}_y^{Offset}(t)$<br><br>c. Roll rate sampling and offset compensation<br>$\tilde{\omega}'_x(n^M) = \tilde{\omega}_x(t) - \tilde{\omega}_x^{Offset}(t)$<br><br>d. Roll angle from integration of roll rate<br>$\theta^M(n^M) = \theta^M(n^M - 1) + \tilde{\omega}'_x(n^M) \cdot dt$<br><br>e. Force Measure<br>$F^* = \tilde{A}'_y(n^M)$<br><br>f. Rotational Kinetic Energy Measure<br>$KE^* = \tilde{\omega}'^2_x(n^M)$<br><br>g. Potential Energy Measure<br>$PE^* = sign(\tilde{\omega}'_x(n^M)) \cdot \theta_0 + \theta^M(n^M)$<br><br>h. Measure Function<br>$R(n^M) = R(n^M - 1) \cdot (1 - \frac{\Delta t^M}{\tau}) + F^* \cdot KE^* \cdot PE^*$<br><br>i. Figure of Merit<br>$FOM(n^M) = |R(n^M)| \cdot (|R(n^M)| - |R(n^M - 1)|)$ | a. Sample interval<br>$dt = t^E(n^E) - t^E(n^E - 1)$<br><br>b. Acceleration sampling and offset compensation<br>$\tilde{A}'_y(n^E) = \tilde{A}_y(t) - \tilde{A}_y^{Offset}(t)$<br><br>c. Roll rate sampling and offset compensation<br>$\tilde{\omega}'_x(n^E) = \tilde{\omega}_x(t) - \tilde{\omega}_x^{Offset}(t)$<br><br>d. Roll angle from integration of roll rate<br>$\theta^E(n^E) = \theta^E(n^E - 1) + \tilde{\omega}'_x(n^E) \cdot dt$<br><br>e. Compensation for roll oscillation effect<br>if $sign(\tilde{\omega}'_x(n^E)) \neq sign(\tilde{\omega}'_x(n^E - 1))$ then<br>$\theta^E(n^E) = \theta^E(n^E - 1) \cdot MAX\left(\frac{1024 - (n^E - n^E_\omega)}{1024}, 0.5\right)$<br>$n^E_\omega = n^E$<br><br>f. Exit Criteria Basis<br>if $|\tilde{A}'_y(n^E)| > A^{Thr}_{y\_1}$ OR<br>$|\tilde{\omega}'_x(n^E)| > \omega^{Thr}_{x\_1}$ then $\Delta t^{E*} = \Delta t^E$ |

Fig. 8c

| | MEASURES ALGORITHM (xxx.1) | ENERGY ALGORITHM (xxx.2) |
|---|---|---|
| Algorithm Detection Criteria (330) | a. Figure of Merit Threshold $FOM^{Thr}(\Delta t^M) = A \cdot \Delta t^M + B$ | a. Identification of Energy Threshold Segment $k = k \ni \theta_k \leq \theta^E < \theta_{k+1}$ |
| | b1. $\Delta t_{min}^M \leq \Delta t^M \leq \Delta t_{max}^M$ AND | b. Distance from Energy Threshold Segment in phase space |
| | b2. $FOM(n^M) > FOM^{Thr}(\Delta t^M)$ AND | $D(\tilde{\omega}_x', \theta^E, n^E, k) = \dfrac{\left[(\omega_{k+1} - \omega_k) \cdot (\theta^E(n^E) - \theta_k) - (\theta_{k+1} - \theta_k) \cdot (|\tilde{\omega}_x'(n^E)| - \omega_k)\right]}{\sqrt{(\theta_{k+1} - \theta_k)^2 + (\omega_{k+1} - \omega_k)^2}}$ |
| | b3. $|FOM(n^M)| > |FOM(n^M - 1)|$ AND | |
| | b4. $|FOM(n^M)| > |FOM(n^M - m)|$ AND | c. Slope of trajectory in phase space $Slope(n^E) = \dfrac{\tilde{\omega}_x'(n^E) - \tilde{\omega}_x'(n^E - 1)}{\theta^E(n^E) - \theta^E(n^E - 1)}$ |
| | b5. $|\tilde{A}_y'(n^M)| > A_y^{Thr\_2}$ AND | d. $\beta = \tan^{-1}\left(Slope(n^E) \cdot \dfrac{180}{\pi}\right)$ |
| | b6. $|\tilde{\omega}_x'(n^M)| > \omega^{Thr\_2}$ | e1. $\beta^{min} < \beta < \beta^{max}$ AND |
| | | e2. $|\tilde{\omega}_x'(n^E)| - |\tilde{\omega}_x'(n^E - 1)| > 0$ AND |
| | | e3. $D(\tilde{\omega}_x', \theta^E, n^E, k) < 0$ AND |
| | | e4. $|\theta^E| > \theta^{Thr}$ |
| | | OR |
| | | f1. $D(\tilde{\omega}_x', \theta^E, n^E, k) < D^{Thr}$ AND |
| | | f2. $|\theta^E| > \theta^{Thr}$ |

Fig. 9a

| Step | Parameter | Value | Algorithm |
|---|---|---|---|
| Data Acquisition & Preprocessing (150) | $dt$ | 0.4 msec | Data Acquisition |
| | $A_Y^{max}$ | Min(20 g , |range of accelerometer|) | Clipping |
| | $\omega_x^{max}$ | Min(300 deg/sec, |range of angular velocity sensor|) | |
| | $T_{Avg\_Offset}$ | 4 sec | Filtering |
| | $T_{Avg}$ | 12.8 msec | |
| Entrance Criteria (306) | $A_Y^{Thr\_1}$ | 1.4 g | Measures & Energy |
| | $\omega^{Thr\_1}$ | 19 deg/sec | Energy |
| Exit Criteria (322) | $\Delta t_{max}^M$ | 165 msec | Measures |
| | $\Delta t_{min}^E$ | 4 sec | Energy |
| | $\Delta t_{max}^E$ | 12 sec | |
| | $\Delta t_{Event}^E$ | 2 sec | |
| Algorithm Calculations (326) | $\theta_0$ | 0.1 deg | Measures |
| | $\tau$ | 400 sec | |
| Algorithm Detection Criteria (330) | $A$ | 6.46E11 (g²deg⁶/ms/s⁴) | 40 ms < t < 96 ms<br>2.59E11 (g²deg⁶/ms/s⁴) | 96 ms < t < 165 ms | Measures |
| | $B$ | -2.34E13 (g²deg⁶/ s⁴) | 40 ms < t < 96 ms<br>-1.36E13 (g²deg⁶/ s⁴) | 96 ms < t < 165 ms | |
| | $\Delta t_{min}^M$ | 40 msec | |
| | $\Delta t_{max}^M$ | 165 msec | |
| | $m$ | 6 | |
| | $A_Y^{Thr\_2}$ | 0.7 g | |
| | $\omega^{Thr\_2}$ | 50 deg/sec | |
| | $\theta_k$ | Experimentally Determined | |
| | $\omega_k$ | Experimentally Determined | |
| | $\beta^{min}$ | 75 deg | Energy |
| | $\beta^{max}$ | 90 deg | |
| | $D^{Thr}$ | $-2.5 \sqrt{deg^2 + (deg/sec)^2}$ | |
| | $\theta^{Thr}$ | 10 deg | |

Fig. 9b

| Step | Parameter | Value | Algorithm |
|---|---|---|---|
| Sensor Recalibration Criteria (400) | $\omega_x^{Thr\_4}$ | 0.8 * max range of roll gyro measurement (e.g. $\omega_x^{Thr\_4}$ = 250 deg/sec) | Measures & Energy |
| | $\Delta t_\omega^{max}$ | 0.5 sec | |
| | $\theta^{Thr}$ | 180 deg | |
| | $\Delta t_\theta^{max}$ | 0.5 sec | |
| | $A_y^{Thr\_4}$ | 0.8 * max range of accelerometer measurement (e.g. $A_y^{Thr\_4}$ = 15 g) | |
| | $\Delta t_A^{max}$ | 3 sec | |
| Sensor Recalibration Criteria (324) | p | 3 | Energy |
| Safing Criteria (200) | $A_Y^{Thr\_3}$ | 1.9 g | Measures & Energy |
| | $\omega^{Thr\_3}$ | 50 deg/sec | |

Fig. 10

| Test | A | B | C | D |
|---|---|---|---|---|
| Type | Corkscrew | Corkscrew | Deceleration Sled | Deceleration Sled |
| Initial Speed MPH | 33 | 28 | 14 | 17 |
| Avg. Deceleration g | | | 1.5 | 2.5 |
| Result | Roll | Non-Roll | Non-Roll | Roll |
| Energy Algorithm TTF (ms) | 537 | - | - | 594 |
| Measures Algorithm TTF (ms) | 855 | - | - | 98 |
| Safing Algorithm TTF (ms) | 846 | - | 43 | 26 |
| Head Closure (ms) | 905 | 800 | 216 | 196 |
| Maximum Roll Angle (deg) | - | 37 | 34 | - |

VEHICLE ROLLOVER DETECTION SYSTEM

CROSS-REFERENCE TO RELATED APPLICATIONS

The instant application claims the benefit of U.S. Provisional Application Ser. No. 60/366,149 filed on Mar. 19, 2002, which is incorporated herein by reference.

BRIEF DESCRIPTION OF THE DRAWINGS

In the accompanying drawings:

FIGS. 8a, 8b and 8c are tables that illustrate details of the rollover detection algorithm;

FIGS. 9a and 9b are tables that illustrate examples of values of parameters of the rollover detection algorithm;

FIG. 10 illustrates a table of conditions associated with various rollover events and non-rollover events;

DESCRIPTION OF EMBODIMENT(S)

There exists a need for a vehicle rollover detection system that provides for discrimination of vehicle rollover sufficiently quickly to enable associated safety restraint actuators, e.g. seat belt pretensioners, air bags or roll curtains, to be deployed before an initial head contact with the interior of the vehicle, particularly for the types of rollovers resulting in relatively fast head closure times. For example, there are some roll events for which head closure may occur before it can be reliably determined from the physics of the roll event whether the vehicle will completely rollover. There further exists a need for a robust vehicle rollover detection system that provides for sufficiently fast discrimination of vehicle rollover responsive to either relatively slow or relatively fast rollover events.

Figures 1A, 1B:
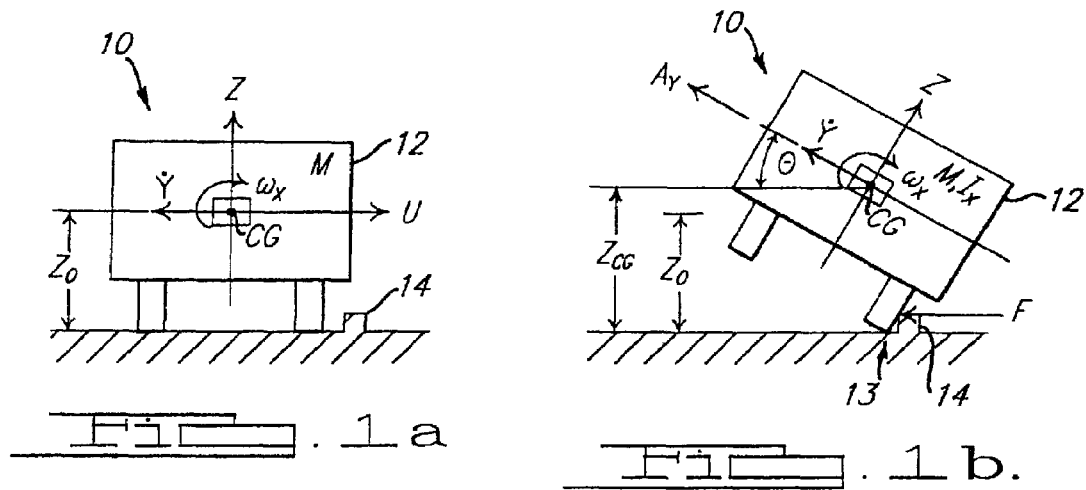
FIG. 1a illustrates a rear view of a vehicle prior to the initiation of a roll event.
FIG. 1b illustrates a rear view of a vehicle during a roll event.

Referring to FIG. 1a, a rollover detection system 10 is seen mounted in a vehicle 12. The vehicle 12 is shown with a local Cartesian coordinate system with the X-axis aligned with the vehicle's longitudinal axis—positive forward,—the Y-axis aligned with the vehicle's lateral axis—positive leftward,—and the Z-axis aligned with the vehicle's vertical axis—positive upward. The vehicle 12 has a mass M, and the associated center-of-gravity CG thereof is located at a height $Z_0$ above the ground The vehicle 12 is shown sliding at a velocity U in the negative Y direction towards an obstruction 14.

Referring to FIG. 1b, upon one or more wheels 16 of the vehicle 12 engaging the obstruction 14, the resulting reaction force F therefrom causes the vehicle 12 to rotate about the X-axis relative to a trip point 13, at a time dependent angular velocity $\omega_x(t)$ causing a time dependent angular position $\theta(t)$, wherein the vehicle 12 has a moment-of-inertia $I_x$ about the associated axis of rotation that is parallel with the X-axis and intersecting the trip point 13. The rotation of the vehicle 12 increases the height $Z_{CG}$ of the center-of-gravity CG relative to the height $Z_0$ thereof prior to engagement with the obstruction 14, thereby increasing the potential energy $M \cdot g \cdot (Z_{CG} - Z_0)$ of the vehicle 12 relative to the pre-engagement position and orientation. Accordingly, the potential energy of the vehicle 12 is dependent upon the angular position $\theta$ thereof. Furthermore, with rotation, the vehicle 12 gains an angular kinetic energy of $$I_x \cdot \frac{\omega_x^2}{2}.$$

The reaction force F also causes a linear acceleration $$A = \frac{F}{M}$$

of the center-of-gravity CG, as indicated by the lateral acceleration component $A_y(t)$ along the local Y-axis. Whereas FIGS. 1a and 1b illustrate a roll event caused by the impact of a sliding vehicle with an obstruction, it should be understood that roll events can be caused by other scenarios, e.g. a tire blowout followed by a subsequent engagement of the associated wheel rim with the ground. Accordingly, the rollover detection system 10 is not limited to a particular type of roll event.

Figure 2:
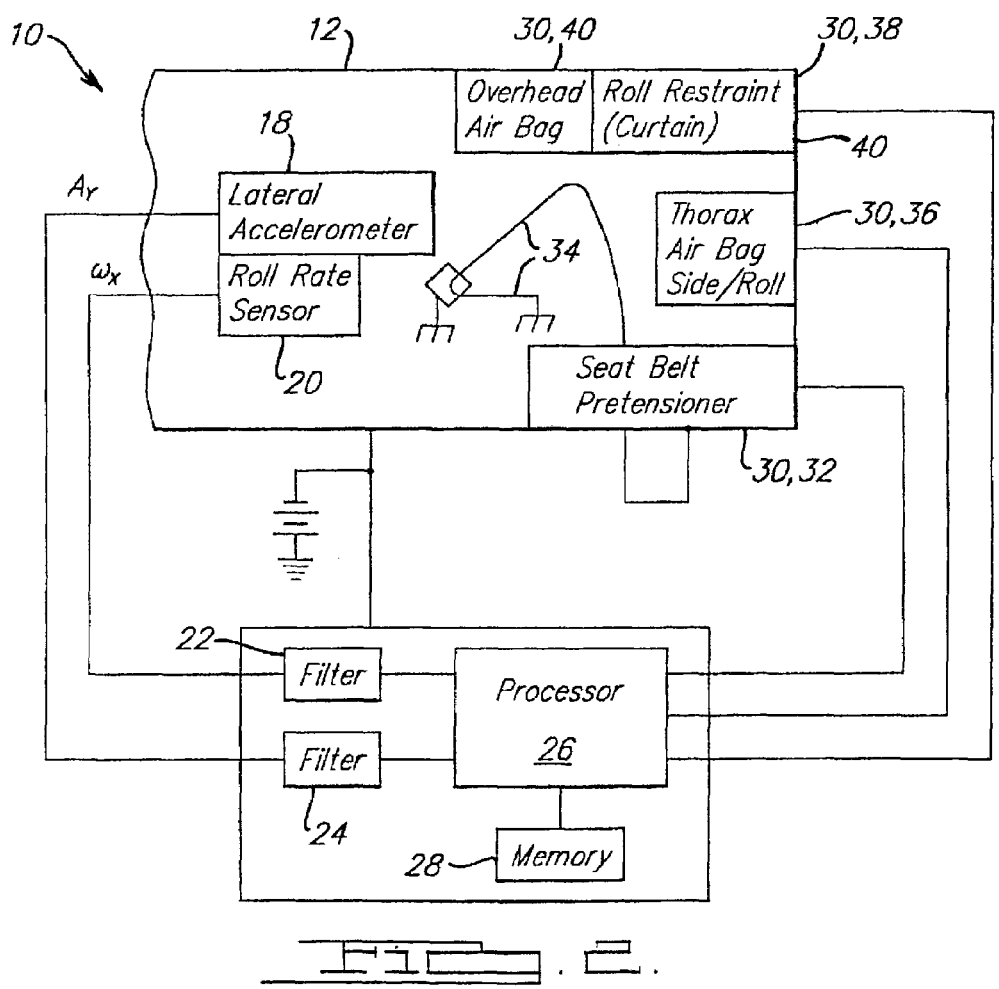
FIG. 2 illustrates a block diagram of a rollover detection system.

Referring to FIG. 2, the rollover detection system 10 comprises a lateral accelerometer 18 and an angular rate sensor 20, which are preferably, but not necessarily, mounted proximate to the center-of-gravity CG of the vehicle 12. The lateral accelerometer 18 is responsive to a time dependent lateral acceleration component $A_y(t)$ of acceleration along the local Y-axis. For example, the lateral accelerometer 18 may comprise an accelerometer, e.g. a micro-machined accelerometer having at least one axis of sensitivity, with an axis of sensitivity substantially aligned with the local Y-axis. The angular rate sensor 20, e.g. a gyroscope, is oriented so as to be responsive to a time-dependent component of angular velocity $\omega_x(t)$ about the local X-axis. The lateral accelerometer 18 and angular rate sensor 20 are operatively coupled to respective filters 22, 24 that filter the respective signals $A_y(t)$ and $\omega_x(t)$ for processing by a processor 26 having a memory 28. It should be understood that the filters 22, 24 can be either separate from or incorporated in the processor 26, and may be either analog or digital, or a combination thereof, as known to one of ordinary skill in the art. Moreover, the filters 22, 24 could be adapted as part of the respective lateral accelerometer 18 or angular rate sensor 20. The processor 26 processes the respective filtered $\tilde{A}_y(t)$ and $\tilde{\omega}_x(t)$ signals so as to discriminate whether or not the vehicle would be likely to roll over, and responsive thereto, to control the actuation of appropriate safety restraint actuators 30 so as to mitigate rollover induced injury to an occupant of the vehicle 12. For example, the processor 26 may comprise a digital computer, microprocessor or other programmable device, an analog processor, analog or a digital circuitry, or a combination thereof. Moreover, the safety restraint actuators 30 may include, but are not limited to, a seat belt pretensioner 32 operatively connected to a seat belt 34; a thorax air bag inflator 36 adapted to provide protection from both rollover and side-impact crashes; a roll curtain 38 adapted to deploy between the occupant and the side window 39 of the vehicle 12; or an overhead air bag inflator 40 adapted to deploy an air bag from the roof or headliner of the vehicle 12. Whereas FIG. 2 illustrates the safety restraint actuators 30 for one seating position of the vehicle 12, it should be understood that safety restraint actuators 30 may be provided at each seating position, and that the rollover detection system 10 can be adapted to control any or all of the safety restraint actuators 30 responsive to rollovers in any direction for which the associated safety restraint actuators 30 are adapted to mitigate occupant injury. Moreover, the particular set of safety restraint actuators 30 need not necessarily include all of those described hereinabove, or may include other types of safety restraint actuators 30 not described hereinabove.

Figure 3:
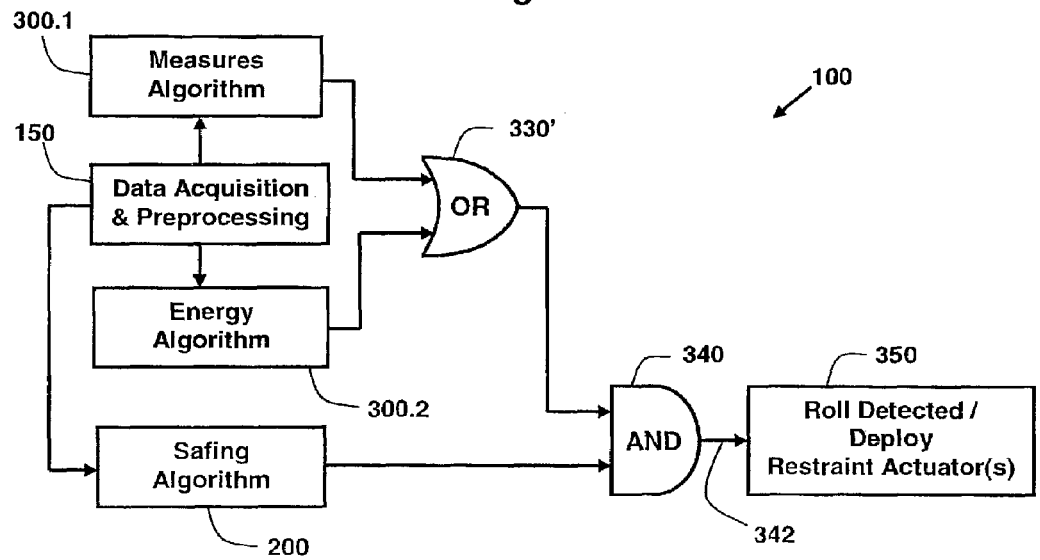
FIG. 3 illustrates a flow diagram of a rollover detection algorithm.

Referring to FIG. 3, in accordance with one embodiment of a rollover detection algorithm 100 for detecting a vehicle rollover and controlling the actuation of one or more associated safety restraint actuators 30—e.g. in accordance with the apparatus illustrated in FIG. 2—comprises the combination of a data acquisition and preprocessing algorithm 150, a measures algorithm 300.1, an energy algorithm 300.2, a safing algorithm 200 and associated logic 330', 340 that generates a signal 342 that controls the actuation of the safety restraint actuator(s) 30 responsive thereto.

The measures algorithm 300.1 uses a heuristic, time-domain discrimination process to detect a rollover condition, and can be beneficial in shortening deployment times for most rollover events characterized by relatively fast head closure times (e.g. <250 msec) that are typically associated with larger lateral vehicle forces. The measures algorithm 300.1 utilizes both the filtered lateral acceleration component $\tilde{A}_y$ and filtered angular velocity $\tilde{\omega}_x$ signals to evaluate a function that is compared with a threshold, that along with other criteria, are used to make a deployment decision.

The energy algorithm 300.2 uses a phase-space discrimination process—based upon the physics associated with a vehicle rollover process—to detect a rollover condition, and can be beneficial in providing reliable deployment decisions for slower roll events that are caused primarily by vertical forces on the vehicle or by low level lateral forces on the vehicle 12. The energy algorithm 300.2 utilizes the filtered angular velocity $\tilde{\omega}_x$ signal to determine the roll state of the vehicle 12 and to compare the instantaneous total energy (rotational kinetic and potential) thereof with that needed to cause the vehicle 12 to roll past an associated equilibrium position. The energy algorithm 300.2 utilizes both the filtered lateral acceleration component $\tilde{A}_y$ and filtered angular velocity $\tilde{\omega}_x$ signals in the associated entrance and exit criteria.

Whereas FIG. 3 illustrates the measures algorithm 300.1 and the energy algorithm 300.2 used in combination, it should be understood that this is not essential, and that either of the algorithms can be used alone. However, the combination of algorithms increases the robustness of the associated rollover detection system 10, because for some conditions, e.g. "curb-trip" conditions, the measures algorithm 300.1 can provide faster discrimination than the energy algorithm 300.2; whereas for other conditions, e.g. "corkscrew", "ramp" or "flip" conditions, the energy algorithm 300.2 can provide faster discrimination than the measures algorithm 300.1.

The measures algorithm 300.1 and energy algorithm 300.2 are independent of one another, although each utilizes common, filtered data from the data acquisition and preprocessing algorithm 150, i.e. a filtered lateral acceleration component $\tilde{A}_y$ and a filtered angular velocity $\tilde{\omega}_x$. Both the measures algorithm 300.1 and the energy algorithm 300.2 are characterized by associated entrance and exit criteria, wherein calculations associated with the respective algorithm are commenced if the respective associated entrance criteria is satisfied, and these calculations are terminated if the respective associated exit criteria is satisfied, and then reset if and when the entrance criteria are subsequently satisfied.

The safing algorithm 200 can improve the reliability of the rollover detection system 10 by providing an independent set of conditions, or safing criteria—dependent upon the filtered lateral acceleration component $\tilde{A}_y$ and/or filtered angular velocity $\tilde{\omega}_x$—that must be met in order to enable the deployment of the one or more associated safety restraint actuators 30. Both the measures algorithm 300.1 and the energy algorithm 300.2 are each "safed" by a common safing algorithm 200. Whereas the safing algorithm 200 provides for additional discrimination so as to mitigate against an undesirable actuation of the safety restraint actuators 30 responsive to non-rollover events, it should be understood that the sating algorithm 200 is not essential, and that either measures algorithm 300.1 or the energy algorithm 300.2 can be used alone, or in combination with one another, with or without the safing algorithm 200.

In the operation of the rollover detection algorithm 100, responsive to data from the data acquisition and preprocessing algorithm 150, if either the measures algorithm 300.1 OR 330' the energy algorithm 300.2 detects a vehicle rollover condition, AND 340 if the safing algorithm 200 determines that an associated independent safing condition is satisfied, then, in step (350), one or more safety restraint actuators 30 are deployed so as to mitigate injury to an associated occupant of the vehicle, that could result from the rollover event, whether or not the vehicle 12 actually rolls over.

The data acquisition and preprocessing algorithm 150, safing algorithm 200, measures algorithm 300.1, and energy algorithm 300.2 are described hereinbelow with reference to flow charts illustrated in FIGS. 3-7. FIG. 6 illustrates a flow chart of a general algorithmic structure of both the measures algorithm 300.1 and the energy algorithm 300.2, wherein particular details of the measures algorithm 300.1 and the energy algorithm 300.2 are provided in table format in FIGS. 8a-c. The algorithms are described mathematically, wherein parameters are used for application specific constants, and these parameters are listed in FIGS. 9a and 9b along with exemplary values for a particular type of vehicle. It should be understood that the parameters are generally adapted to a particular application, e.g. vehicle platform, and that the particular values of the parameters in FIGS. 9a and 9b are illustrative only, and should not be considered to limit the scope of the instant invention.

Figure 4:
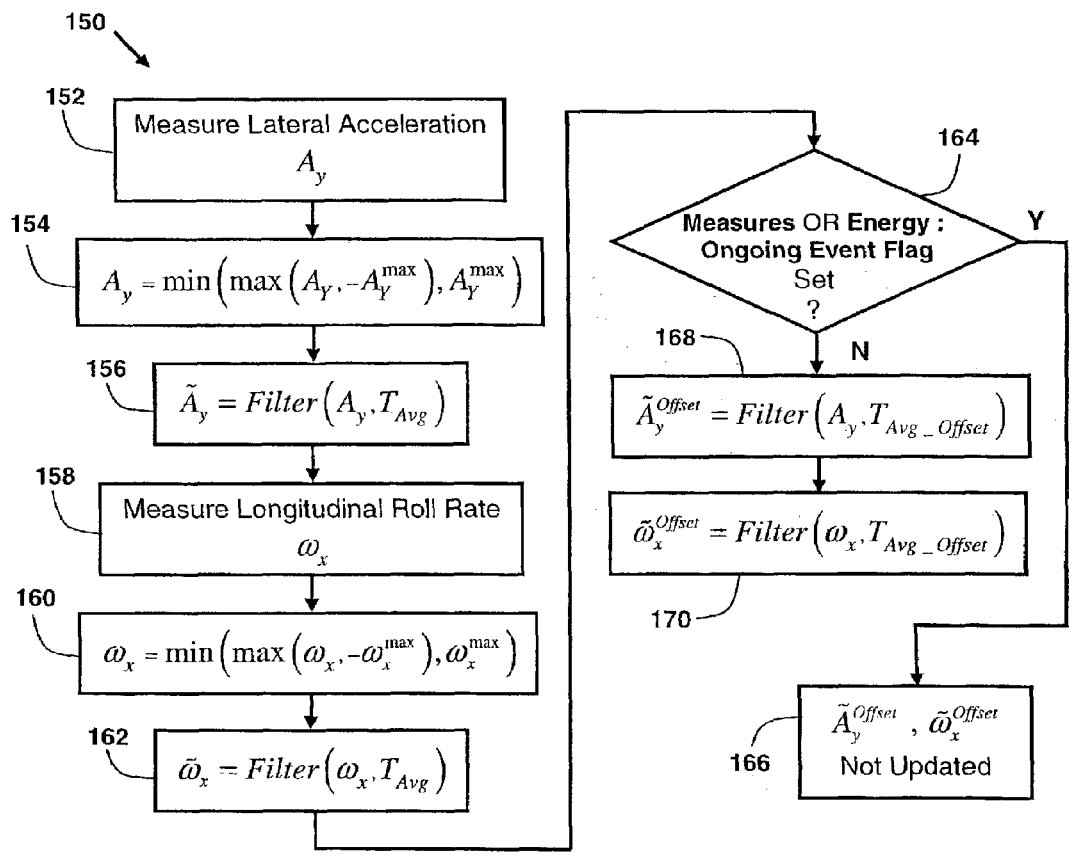
FIG. 4 illustrates a flow diagram of a data acquisition and preprocessing algorithm incorporated in the rollover detection algorithm.

Referring to FIG. 4, the data acquisition and preprocessing algorithm 150 acquires a measurement of lateral acceleration component $A_y$ from the lateral accelerometer 18 in step (152), and acquires a measurement of longitudinal angular velocity $\omega_x$, or roll rate, from the angular rate sensor 20 in step (158). Data from more than 100 rollover tests has indicated that the angular velocity $\omega_x$ associated with a rollover generally ranges between ±300 degrees/second $$(\pm |\omega_x^{max}|)$$

and the lateral acceleration component $A_y(t)$ associated therewith generally ranges between $$\pm 20 \text{ g} (\pm |A_Y^{max}|).$$

Respective measurements of the lateral acceleration component $A_y(t)$ and the angular velocity $\omega_x$ that exceed these respective limits are respectively clipped thereat in steps (154) and (160) respectively. For example, the value of an lateral acceleration component $A_y(t)$ measurement less that −20 g would be set in step (154) to −20 g, for the example of an associated range of ±20 g. The polarities of the lateral accelerometer 18 and the angular rate sensor 20 are set so that the corresponding polarities of angular velocity $\omega_x$ and the lateral acceleration component $A_y$ signals are the same as each other during a roll event. Generally, the level $$|A_Y^{max}|$$

for clipping signals from the lateral accelerometer 18 is set to the minimum of either 20 g or the range of the lateral accelerometer 18. Similarly, the level $$|\omega_x^{max}|$$

for clipping signals from the angular rate sensor 20 is set to the minimum of either 300 degrees/second or the range of the angular rate sensor 20.

The raw lateral acceleration component $A_y$ and angular velocity $\omega_x$ data from the lateral accelerometer 18 and the angular rate sensor 20 respectively are filtered by respective filters 22, 24 in steps (156) and (162) respectively, so as to respectively provide a filtered lateral acceleration component $\tilde{A}_y$ and a filtered angular velocity $\tilde{\omega}_x$. The use of filtered measurements is beneficial in avoiding a false entrance of the roll discrimination algorithm, and in improving the associated discrimination process by the measures algorithm 300.1 and the energy algorithm 300.2. The filters 22, 24 are, for example, moving average filters having a moving average window of $T_{Avg}$, e.g. between 10 and 15 milliseconds, so as to provide a suitable compromise between fast signal response and noise reduction. As an example, for a processor 26 that uniformly samples the angular velocity $\omega_x$ and lateral acceleration component $A_y$ signals—as is assumed hereinbelow—with a sampling rate of 2500 Hz (corresponding to a sample period dt=0.4 milliseconds) and a window of 12.8 milliseconds, a moving average for each signal would be calculated from the last 32 samples acquired. The individual samples of the moving average are typically uniformly weighted, but could alternatively be non-uniformly weighted.

Generally, the lateral accelerometer 18 and the angular rate sensor 20 can exhibit offset and/or drift error (generally referred to herein as sensor offset error), which, unless otherwise compensated, can cause associated roll detection errors. The sensor offset errors are estimated by filtering the associated sensor measurements with associated filters having an effective cutoff frequency that is substantially lower—or, stated in another way, a effective filter time constant that is substantially greater—than the associated above-described moving-average filters that provide the filtered lateral acceleration component $\tilde{A}_y$ and the filtered angular velocity $\tilde{\omega}_x$. For example, the acceleration offset $$\tilde{A}_y^{Offset}$$

and the angular velocity offset $$\tilde{\omega}_x^{Offset}$$

are filtered from the associated raw measurements of angular velocity $\omega_x$ and lateral acceleration component $A_y$ respectively, by respective moving average filters in steps (168) and (170) respectively, each moving-average filter having an associated filter window of width $T_{Avg\_Offset}$, e.g. about 4 seconds. From step (164), the filtered values of acceleration offset $$\tilde{A}_y^{Offset}$$

and angular velocity offset $$\tilde{\omega}_x^{Offset}$$

are updated only if the neither the measures algorithm 300.1 nor the energy algorithm 300.2 have been entered, as indicated by neither associated ONGOING_EVENT_FLAGs—i.e. neither an ONGOING_MEASURES_EVENT_FLAG nor an ONGOING_ENERGY_EVENT_FLAG—being set. Accordingly, in step (166), the relatively long-term filtered values of acceleration offset $$\tilde{A}_y^{Offset}$$

and angular velocity offset $$\tilde{\omega}_x^{Offset}$$

are not updated during periods of time when the associated lateral acceleration component $A_y$ and angular velocity $\omega_x$ could be substantially different from the associated sensor offset values.

Whereas FIG. 4 illustrates the acquisition and processing of the lateral acceleration component $A_y$ before that of the angular velocity $\omega_x$, it should be understood that the relative order could be reversed, or these operations could be performed in parallel.

The measures algorithm 300.1, energy algorithm 300.2, and the safing algorithm 200 each utilize values of filtered lateral acceleration component $\tilde{A}_y$ and filtered angular velocity $\tilde{\omega}_x$ that are compensated by subtracting the corresponding sensor offsets, i.e. the acceleration offset $$\tilde{A}_y^{Offset}$$

and the angular velocity offset $$\tilde{\omega}_x^{Offset}$$

respectively, so as to provide a corresponding compensated lateral acceleration component $$(A'_y(t) = \tilde{A}_y(t) - \tilde{A}_y^{Offset}(t))$$

and a compensated angular velocity $$(\omega'_x(t) = \tilde{\omega}_x(t) - \tilde{\omega}_x^{Offset}(t))$$

respectively.

Figure 5:
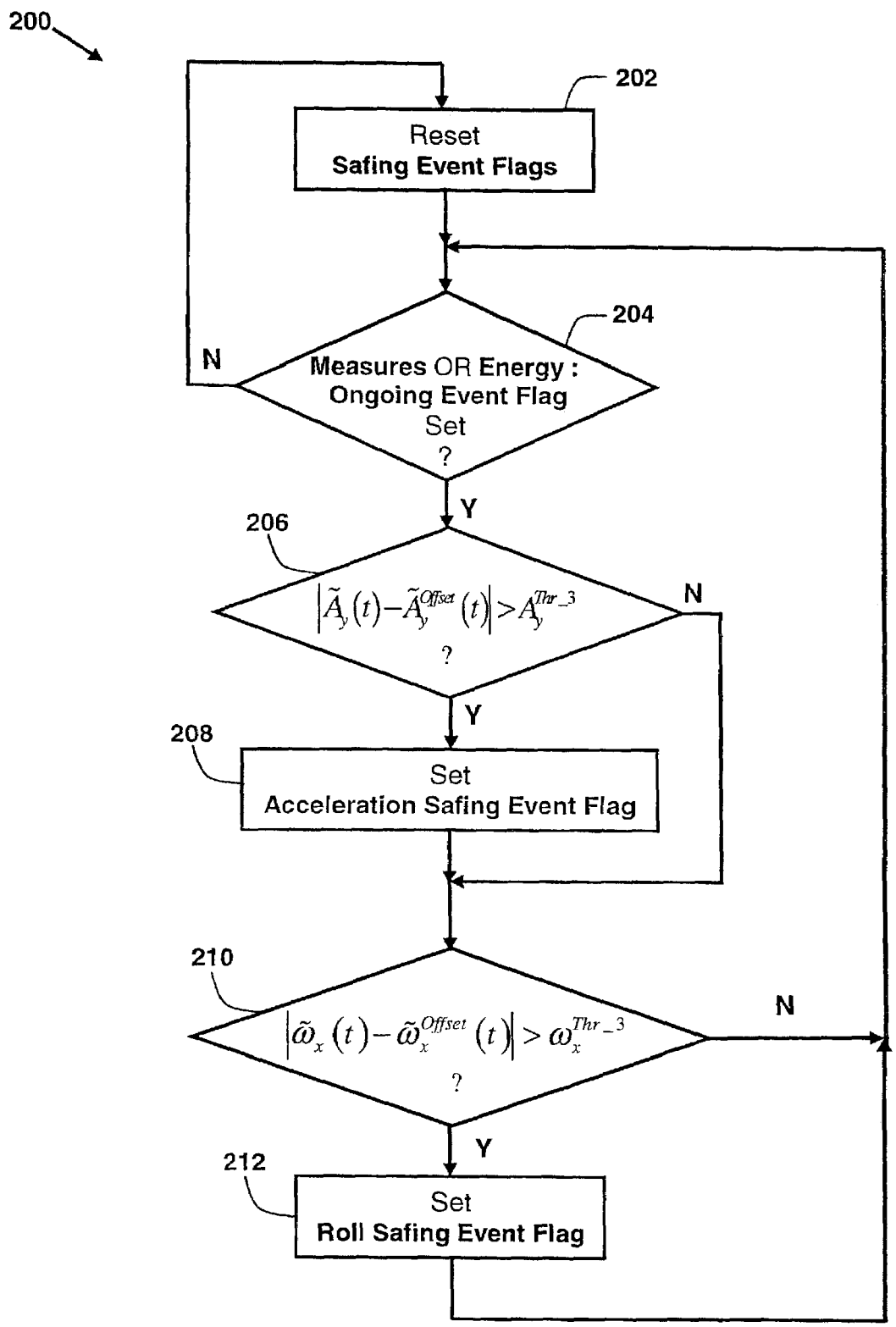
FIG. 5 illustrates a flow diagram of a safing algorithm incorporated in the rollover detection algorithm.
Figure 6:
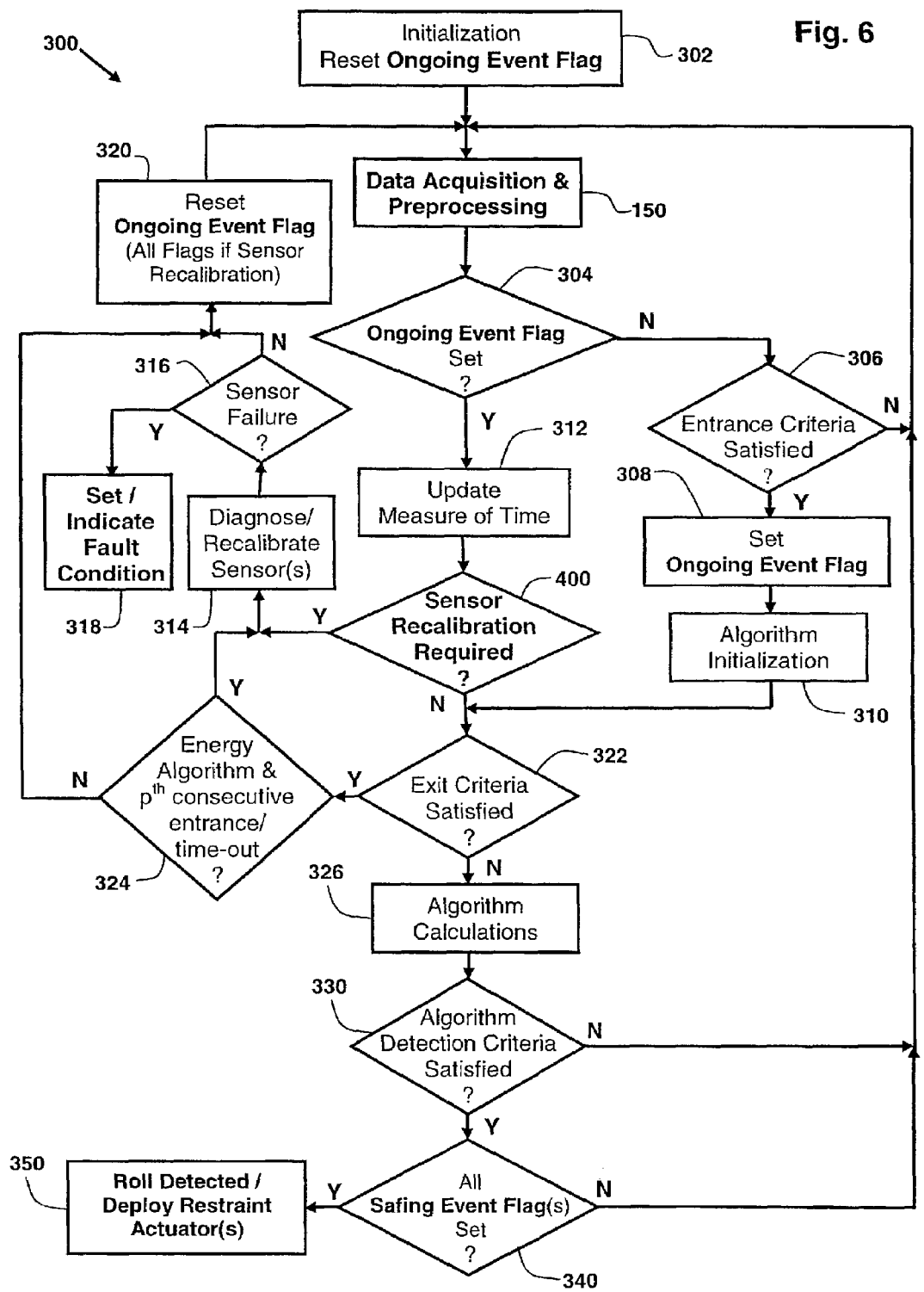
FIG. 6 illustrates a flow diagram of the rollover detection algorithm.

Referring to FIG. 5, the safing algorithm 200 commences with step (202), wherein associated SAFING_EVENT_FLAGs—i.e. an ACCELERATION_SAFING_EVENT_FLAG and a ROLL_SAFING_EVENT_FLAG—are initially reset. Then, in step (204), if either the measures algorithm 300.1 or the energy algorithm 300.2 have been entered, as indicated by either of the associated ONGOING_EVENT_FLAGs (i.e. the ONGOING_MEASURES_EVENT_FLAG or the ONGOING_ENERGY_EVENT_FLAG) being set, then in step (206), if the magnitude of the compensated lateral acceleration component $A'_y$ is greater than a third acceleration threshold $$A_y^{Thr\_3},$$

then the ACCELERATION_SAFING_EVENT_FLAG is set in step (208). Otherwise, from step (204), the process repeats with step (202). Following step (208), or otherwise from step (206), in step (210), if the magnitude of the compensated angular velocity $\omega'_x$ is greater than a third angular velocity threshold $$\omega_x^{Thr\_3},$$

then the ROLL_SAFING_EVENT_FLAG is set in step (212). Then, or otherwise from step (210), the process repeats with step (204). Accordingly, if the conditions on lateral acceleration and angular velocity associated with the safing algorithm 200 have been satisfied—not necessarily simultaneously—after at least one of the measures algorithm 300.1 and the energy algorithm 300.2 have commenced and before both have exited, then the respective associated SAFING_EVENT_FLAGs are set so as to enable a deployment of the one or more associated safety restraint actuators 30 responsive to the detection of a roll event by either the measures algorithm 300.1 or the energy algorithm 300.2. Each of the SAFING_EVENT_FLAGs are set, or latched, separately, but both are reset simultaneously, and both must be set in order for the one or more associated safety restraint actuators 30 to be actuated responsive to the measures algorithm 300.1 or the energy algorithm 300.2.

Alternatively, the safing algorithm 200 may be adapted to incorporate only one of the above-described SAFING_EVENT_FLAGs and associated criteria, so that the safing criteria is responsive to at least one of a magnitude of the compensated lateral acceleration component $A'_y$ being greater than a third acceleration threshold $$A_y^{Thr\_3}$$

at a first point of time following a time of inception of either the measures algorithm 300.1 or the energy algorithm 300.2, and a magnitude of the compensated angular velocity $\omega'_x$ being greater than a third angular velocity threshold $$\omega_x^{Thr\_3}$$

at a second point of time following the time of inception, wherein the time of inception is the time at which the associated entrance criteria are satisfied for the associated measures algorithm 300.1 or energy algorithm 300.2, and the first and second points of time following the time of inception are arbitrary with respect to one another. For example, the energy algorithm 300.2 could be "safed" responsive solely to the compensated lateral acceleration component A'$_y$ being greater than a third acceleration threshold $$A_y^{Thu\_3}$$

at a point of time following a time of inception of the energy algorithm 300.2.

The rollover detection system 10 may be adapted for improved reliability by implementing the safing algorithm 200 on a microprocessor that is separate from that used to implement either the measures algorithm 300.1 or the energy algorithm 300.2, in which case if the safing algorithm 200 is not aware of the ONGOING_EVENT_FLAGs, then instead of being reset responsive to these flags, the SAFING_EVENT_FLAGs may be reset after a delay, e.g.

$$\Delta t_{max}^E$$

(e.g. 12 seconds), following a point in time at which either safing criteria was last satisfied so that the safing condition remains active until either a deployment of the one or more associated safety restraint actuators 30, or until after both algorithms will have had to have exited.

The measures algorithm 300.1 and the energy algorithm 300.2 each operate in accordance with the general algorithmic structure illustrated in FIG. 6, wherein each of these algorithms is indicated generally by reference number 300. A decimal designator to a particular reference number will be used herein to refer to a particular algorithm. For example, whereas the general overall process is referred to by reference number 300, reference number 300.1 is used to refer to the measures algorithm, and reference number 300.2 is used to refer to the energy algorithm. As an other example, whereas the general algorithm calculations step is referred to by reference number 326, reference number 326.1 is used to refer to the algorithm calculations step of the measures algorithm 300.1 in particular, and reference number 326.2 is used to refer to the algorithm calculations step of the energy algorithm 300.2. The particular equations associated with particular algorithmic steps, for each of the algorithms, are provided in tabular form in FIGS. 8a-c; and the associated parameters and exemplary values thereof are provided in tabular form in FIGS. 9a-b.

Referring to FIG. 6, the general roll processing algorithm commences with step (302), wherein a corresponding ONGOING_EVENT_FLAG is reset. The ONGOING_EVENT_FLAG, when set, indicates that the entrance criteria has been satisfied for the roll processing algorithm, and the corresponding exit criteria has not been satisfied, so that the associated algorithm is active. Then in step (150), the associated data that is used by the algorithm is acquired and preprocessed in accordance with the data acquisition and preprocessing algorithm 150 described hereinabove. Then, in step (304), if the ONGOING_EVENT_FLAG has not been set—indicating that data from a potential roll event is not being processed, and that the vehicle 12 is not then involved in a roll event—then, in step (306), a set of entrance criteria are evaluated and compared with associated thresholds, and if the entrance criteria are satisfied, then in step (308) the ONGOING_EVENT_FLAG is set, and in step (310), the algorithm is initialized, e.g. by initializing various dynamic variables associated with the algorithm.

Figure 7:
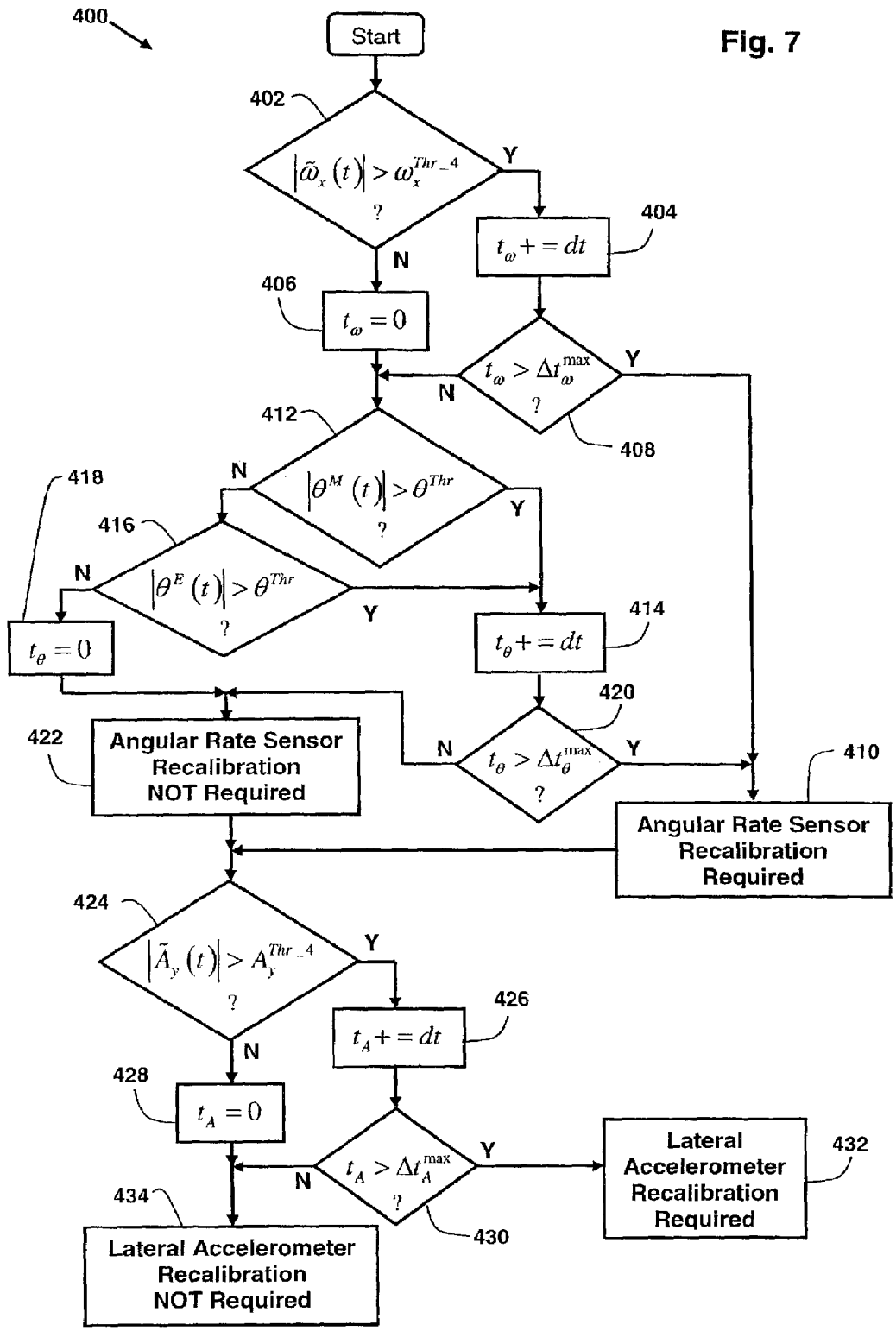
FIG. 7 illustrates a flow diagram of an algorithm incorporated in the rollover detection algorithm for determining if sensor recalibration is required.
Figure 11A:
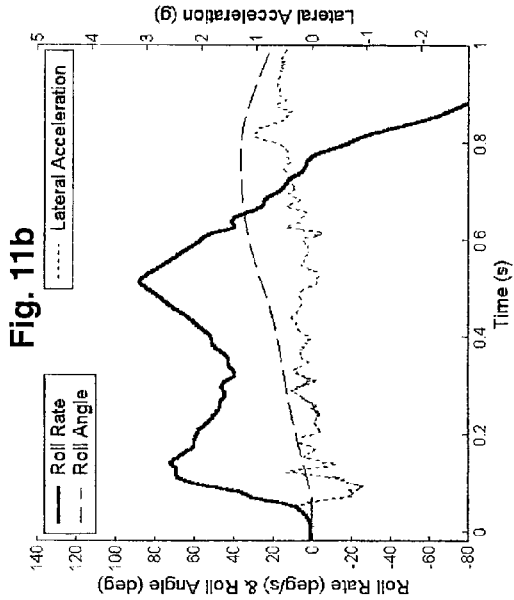
FIG. 11a illustrates a plot of filtered roll rate, roll angle and filtered lateral acceleration of a vehicle subjected to a corkscrew roll test designated as Test A, resulting in a rollover event.
Figure 11B:
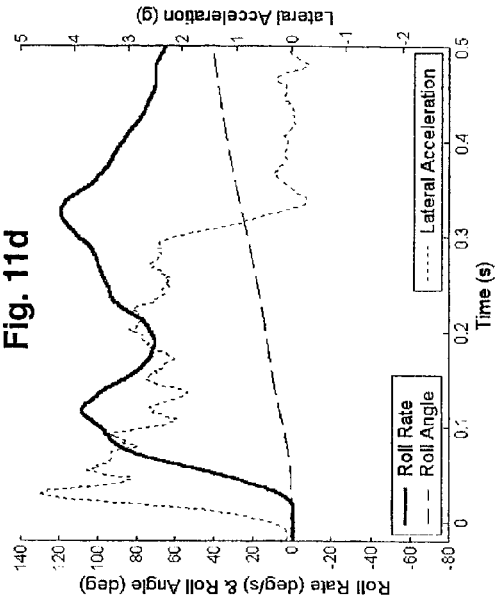
FIG. 11b illustrates a plot of filtered roll rate, roll angle and filtered lateral acceleration of a vehicle subjected to a corkscrew roll test designated as Test B, resulting in a non-rollover event.
Figure 11C:
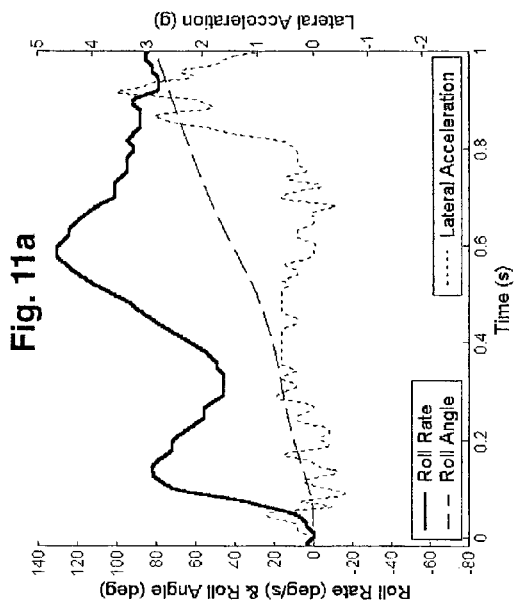
FIG. 11c illustrates a plot of filtered roll rate, roll angle and filtered lateral acceleration of a vehicle subjected to a deceleration sled test designated as Test C, resulting in a non-rollover event.
Figure 11D:
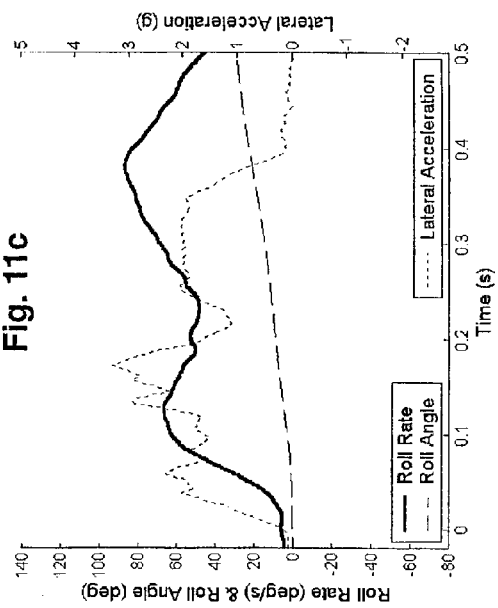
FIG. 11d illustrates a plot of filtered roll rate, roll angle and filtered lateral acceleration of a vehicle subjected to a deceleration sled test designated as Test D, resulting in a rollover event.

Otherwise, from step (304), if the ONGOING_EVENT_FLAG has been set—indicating that data from a potential roll event is being processed,—then in step (312) an associated measure of time, e.g. sample count, is updated, and in step (400), the newly acquired data is evaluated so as to determine if a sensor (i.e. the lateral accelerometer 18 or the angular rate sensor 20) needs to be recalibrated. The process associated with step (400) is illustrated in FIG. 7 and is described more fully hereinbelow.

If, from step (400), one or more sensors require recalibration, then in step (314), the one or more sensors requiring recalibration are recalibrated. For example, both the lateral accelerometer 18 and the angular rate sensor 20 may be testable, wherein a known stimulus may be applied to the sensor, and the corresponding sensor output may be calibrated so as to represent the known stimulus. For example, the lateral accelerometer 18 may comprise a micro-machined mass element suspended by spring-element beams, and an electrostatic field may be applied between the mass element and a housing so as to deflect the beam by an amount that corresponds to a reference acceleration level. A calibration factor is then calculated so that the calibrated output from strain sensing elements operatively connected to the spring-element beams corresponds to the reference acceleration level. If, in step (316), the process of step (314) indicates that one or more sensors have failed—for example, if there is substantially no change in output responsive to whether or not the test stimulus is applied to the sensor, then in step (318) a fault condition is set; a warning device, e.g. light, is activated so as to alert the driver of the vehicle 12; and the rollover detection system 10 is disabled from deploying any safety restraint actuators 30. Otherwise, from step (316), i.e. if neither the lateral accelerometer 18 nor the angular rate sensor 20 has failed, then, in step (320), both ONGOING_EVENT_FLAGs—i.e. the ONGOING_MEASURES_EVENT_FLAG and the ONGOING_ENERGY_EVENT_FLAG—are reset responsive to there having been at least one sensor recalibration, and the process repeats anew with step (150).

Otherwise, from step (400), if none of the sensors require recalibration, then, in step (322), an exit criteria is evaluated so as to determine whether the algorithm should be exited until such time that the entrance criteria of step (306) are again satisfied so as to enable the algorithm to be reentered. If, from step (322), the exit criteria are satisfied, then, in step (324), if the algorithm is the energy algorithm 300.2, and if the energy algorithm 300.2 has consecutively been entered in step (306), and then exited in step (322) as a result of a time-out (i.e.

$$\Delta t > \Delta t_{max}^E),$$

then reentered in step (306) shortly—e.g. during the next iteration of the algorithm—after exiting in step (322), then after the p$^{th}$ consecutive exit in step (322)—e.g. p=3—the process continues with step (314) as described hereinabove, wherein the sensors are diagnosed, and if necessary, recalibrated. Otherwise, from step (324), the associated ONGOIN- G_EVENT_FLAG—i.e. the ONGOING_MEASURES_EVENT_FLAG or the ONGOING_ENERGY_EVENT_FLAG—is reset in step (320), and the process repeats anew with step (150).

Otherwise, from step (322), if the algorithm has been entered in step (306) and not exited in step (322), then the associated algorithm calculations are performed for the particular iteration of the algorithm associated with a particular value of the measure of time from either steps (310) or (312). Then, in step (330), if the associated algorithm detection criteria are satisfied in the particular iteration of the algorithm, and if, in step (340), the SAFING_EVENT_FLAG(s)—i.e. the ACCELERATION_SAFING_EVENT_FLAG and the ROLL_SAFING_EVENT_FLAG—have been set, then in step (350) a roll event has been detected, and the associated safety restraint actuators 30 are actuated. Otherwise either, from step (330), if the algorithm detection criteria are not satisfied, or, from step (340), if all of the SAFING_EVENT_FLAG(s) have not been set—so that the associated safing criteria has not been satisfied at some point in time during either the measures algorithm 300.1 or the energy algorithm 300.2, then the process continues repeats beginning with step (150) for the next iteration.

Although both the measures algorithm 300.1 and the energy algorithm 300.2 depend upon measurements of the lateral acceleration component $A_y$ and the longitudinal angular velocity $\omega_x$ from the data acquisition and preprocessing algorithm 150, the other variables and parameters associated with each algorithm are otherwise independent of one another, as are the associated entrance criteria in step (306), algorithm initializations in step (310), exit criteria in step (322), algorithm calculations in step (326), and algorithm decision criteria in step (330), examples of all of which are detailed in FIGS. 8a, 8b, 8c, 9a and 9b. For example, whereas each algorithm determines a measure of time since inception, and calculates a measure of roll angle by integrating the measurement of longitudinal angular velocity $\omega_x$, these respective measures of time are independent of one another, as are the respective measures of roll angle. Both the measures algorithm 300.1 and the energy algorithm 300.2 assume that the vehicle is initially level (i.e. $\theta(t_{entrance})=0$) when the processing by the respective algorithms is commenced.

The process 400 for determining whether or not either the lateral accelerometer 18 or the angular rate sensor 20 requires recalibration is illustrated in FIG. 7. In steps (402), (404), (406) and (408), if the magnitude of the filtered angular velocity $\tilde{\omega}_x$ continuously exceeds a fourth angular rate threshold $$\omega_x^{Thu\_4}$$

for an associated period of time $$\Delta t_\omega^{max},$$

then a recalibration of the angular rate sensor 20 is signaled in step (410). Otherwise, in step (412), (414), (416), (418) and (420), if the either the magnitude of the roll angle $\theta^M$ from the measures algorithm 300.1, or roll angle $\theta^E$ from the energy algorithm 300.2, continuously exceeds a roll angle threshold $\theta^{Thr}$ for an associated period of time $$\Delta t_\theta^{max},$$

then a recalibration of the angular rate sensor 20 is signaled in step (410). Otherwise, in step (422), a recalibration of the angular rate sensor 20 is not signaled. In steps (424), (426), (428) and (430), if the magnitude of the filtered lateral acceleration component $\tilde{A}_y$ continuously exceeds a fourth lateral acceleration threshold $$A_y^{Thu\_4}$$

for an associated period of time $$\Delta t_A^{max},$$

then a recalibration of the lateral accelerometer 18 is signaled in step (432). Otherwise, in step (434), a recalibration of the lateral accelerometer 18 is not signaled. If a recalibration was signaled in either steps (410) or (432), then the process continues with step (314) as described hereinabove. Otherwise, no sensor recalibration is signaled, and the process continues with step (322) as described hereinabove.

Referring to FIG. 6, FIGS. 8a-c, and FIGS. 9a-b, the measures algorithm 300.1 will now be discussed with greater particularity, wherein the steps of FIG. 6 are suffixed with "0.1" to indicate their association therewith. The ONGOING_EVENT_FLAG for measures algorithm 300.1—referred to as the ONGOING_MEASURES_EVENT_FLAG—is set in step (308.1) upon satisfaction of the entrance criteria in step (306.1), and is reset in step (320.1) upon satisfaction of the exit criteria in step (322.1). The ONGOING_MEASURES_EVENT_FLAG, for example, could correspond to a particular location in the memory 28 of the associated processor 26 that implements the measures algorithm 300.1. After entry following step (306.1), the measures algorithm 300.1 is not subsequently exited until either the measures event exit criteria is satisfied in step (322.1), or until a roll event is detected causing a deployment of the safety restraint actuators 30. Moreover, after the measures event exit criteria is satisfied and the measures algorithm 300.1 is exited, the measures algorithm 300.1 can be subsequently reentered if the associated measures event entrance criteria is subsequently satisfied.

In step (306.1), the entrance criteria of the measures algorithm 300.1 is, for example, that the magnitude of the compensated lateral acceleration component $A'_y$ be greater than a first acceleration threshold $$A_y^{Thu\_1},$$

i.e.:

$$|A'_y(t)| > A_y^{Thu\_1}$$

For an example of one particular type of vehicle, based upon actual rollover data, the first acceleration threshold $$A_y^{Thr\_1}$$

was set to about 1.4 g. It should be recognized that this threshold value, as well as the value of the other parameters of the measures algorithm 300.1, is generally dependent upon the characteristics of the particular associated vehicle 12 or class of vehicles, and that the particular value used for a particular rollover detection system 10 can be adjusted for improved discrimination dependent upon the nature of the associated vehicle 12 or class of vehicles.

In step (310.1), upon initial entrance to the measures algorithm 300.1 following step (308.1), the measures algorithm 300.1 is initialized. An event sample count $n^M$ and the values of angular position $\theta^M(n^M-1)$ and a measure function $R(n^M-1)$ are initialized—e.g. to values of zero. Also the sampled time $t^M(-1)$ just prior to the time of event entrance is initialized to a value of the time of measures event entrance $t^M(0)$, which is initialized to a value of the current time t; and the time period $\Delta t^M(0)$ since algorithm entrance is initialized to a value of zero. The superscript "M" used herein refers to variables associated with the measures algorithm 300.1.

Upon subsequent iteration of the measures algorithm 300.1, if in step (304.1) the ONGOING_MEASURES_EVENT_FLAG is set, then, in step (312.1), the event sample count $n^M$ is incremented, the associated current sampled time $t^M(n^M)$ is set equal to the current time t, and the measures event time $\Delta t^M$ is calculated as the period extending from the time of measures event entrance $t^M(0)$, to the current time $t^M(n^M)$ as follows:

$$\Delta t^M(n^M) = t^M(n^M) - t^M(0)$$

In step (322.1), the exit criteria of the measures algorithm 300.1 is, for example, that the time period since algorithm entrance $\Delta t^M(n^M)$ be greater than time period threshold $$\Delta t_{max}^M, \text{i.e.}: \Delta t^M(n^M) > \Delta t_{max}^M$$

For the example of one particular type of vehicle, based upon actual rollover data, the time period threshold $\Delta t^M$ was set to about 165 milliseconds. Upon exit from the measures algorithm 300.1, the ONGOING_MEASURES_EVENT_FLAG is reset in step (320.1), and pending subsequent satisfaction of the entrance criteria in step (306.1), this causes the variables associated with the measures algorithm 300.1 to be initialized in step (310.1).

If, in step (322.1), the exit criteria is not satisfied, then the algorithm calculations are updated in step (326.1) for the particular iteration of the measures algorithm 300.1, as follows.

First, the angular position $\theta^M$ is estimated by integrating the signed value of the compensated angular velocity $\omega'_x$ as follows:

$$\theta^M(n^M) = \theta^M(n^M-1) + \omega'_x(n^M) \cdot dt$$

wherein the integration time step dt is given by the difference between the time $t^M(n^M)$ at the current iteration, and the time at the previous iteration $t^M(n-1)$—which difference would be constant for a uniform sampling rate—as follows:

$$dt = t^M(n^M) - t^M(n^M-1)$$

and the compensated angular velocity $\omega'_x$ is given by:

$$\omega'_x(t) = \tilde{\omega}_x(t) - \tilde{\omega}_x^{Offset}(t)$$

A measure function R is then evaluated, which is used to calculate a figure-of-merit FOM. The measure function R is given by:

$$R(n^M) = R(n^M-1) \cdot \left(1 - \frac{\Delta t^M}{\tau}\right) + F^* \cdot KE^* \cdot PE^*$$

The first term of the measure function R is a damping term comprising the product of the previous value, $R(n^M-1)$ multiplied by a damping factor $$\left(1 - \frac{\Delta t^M}{\tau}\right).$$

The level of damping is determined by a constant $\tau$ dependent upon the particular type of vehicle. For example, based upon rollover test data for a particular type of vehicle, the value of $\tau$ was determined to be about 400 seconds. The damping term ensures that the resulting figure-of-merit FOM will decrease for events for which the values of the compensated lateral acceleration component $A'_y$ or the compensated angular velocity $\omega'_x$ do not continue to be significant.

The remaining term of the measure function R, additive with the first term, is the product of the following three measures: a force measure $F^*$, a rotational kinetic energy measure $KE^*$, and a potential energy measure $PE^*$.

The force measure $F^*$ is given as the current sample of the compensated lateral acceleration component $A'_y$, which is given by:

$$A'_y(n^M) = \tilde{A}_y(t) - \tilde{A}_y^{Offset}(t)$$

Generally, force and acceleration are related by Newton's second law ($F=M \cdot A$). The force measure $F^*$ is not necessarily an exact measure of force—which would generally need to account for the vector nature of force and acceleration—but instead is a measure that is at least related to the reaction force F acting upon the vehicle 12. During a typical vehicle roll event, the compensated lateral acceleration component $A'_y$, is caused by a lateral force on the tires or wheel rim. This lateral force is the same force responsible for the rotational torque about the center of vehicle mass that leads to eventual rollover. The compensated lateral acceleration component $A'_y$ does not necessarily provide a complete measure of the actual reaction force F. For example, the compensated lateral acceleration component $A'_y$ does not necessarily account for the effects of non-rigid body dynamics, e.g. from damping forces in the tire(s) or other damping elements, or from the dynamics of the suspension system. However, the compensated lateral acceleration component $A'_y$ is heuristically—for small angles and excluding the effects of non-rigid body dynamics—proportional to the reaction force F that causes the vehicle 12 to roll. Data from fast or tripped rollover tests has shown that the compensated lateral acceleration component $A'_y$ becomes significant about 20 milliseconds before significant compensated angular velocity $\omega'_x$ is observed from angular rate sensor 20. Whereas the force measure F* is illustrated herein as linear with respect to the compensated lateral acceleration component $A'_y$, it should be understood that the force measure F* could be some other function (other than linear) or power (other than 1) of the compensated lateral acceleration component $A'_y$.

The rotational kinetic energy measure KE* is given by $\tilde{\omega}'^2_x$. Generally, the rotational kinetic energy measure KE* is related to the rotational kinetic energy of the vehicle. For example, with $KE^*=\tilde{\omega}'^2_x$, the rotational kinetic energy measure KE* is proportional to the rotational kinetic energy of the vehicle 12 by the proportionality constant $I_x/2$. However, the rotational kinetic energy measure KE* could also be represented differently. For example, other powers of $\tilde{\omega}'_x$ other than 2 could be used to form the rotational kinetic energy measure KE* from compensated angular velocity $\omega'_x$, or the rotational kinetic energy measure KE* could be some other function of compensated angular velocity $\omega'_x$.

The product of the force measure F* and the rotational kinetic energy measure KE* provides for a measure that predicts rollover more quickly than compensated angular velocity $\omega'_x$ alone. This also provides a predictive measure of eventual compensated angular velocity $\omega'_x$, because it has been observed that significant lateral force inferred from the compensated lateral acceleration component $A'_y$ usually manifests as increased compensated angular velocity $\omega'_x$ about 20 milliseconds thereafter. Moreover, weighting the compensated angular velocity $\omega'_x$ more heavily than the compensated lateral acceleration component $A'_y$, e.g. by using the square of the compensated angular velocity $\omega'_x$, increases the influence of actual compensated angular velocity $\omega'_x$ upon the resulting figure-of-merit FOM.

The potential energy measure PE* is given as $PE^*=\text{sign}(A'_y(n^M))\cdot\theta_0+\theta^M(n^M)$ as a constant plus the current sample of the angular position $\theta^M(n^M)$. The constant $\theta_0$ is dependent upon the particular vehicle. For example, based upon rollover test data for a particular type of vehicle, the value of $\theta_0$ is about 0.1 degrees. The constant term has the same sign as either the compensated angular velocity $\omega'_x$ or the compensated lateral acceleration component $A'_y$, assuming both signals are polarized so as to have the same polarity for a given roll event. Including the potential energy measure PE* in the product term of the measure function R increases the influence of roll dynamics upon the resulting figure-of-merit FOM and increases the magnitude thereof for medium-speed roll events, for example, events having associated actuator firing times (time-to-fire TTF) of typically between 140 and 230 milliseconds. (The bounds of this range could be extended by 20% or more depending upon the vehicle characteristics, and could be further different for different types of vehicles). Compared with the force measure F* and with the rotational kinetic energy measure KE*, the potential energy measure PE* is relatively less significant, and could be ignored (e.g., by setting PE*=1) in a reduced rollover detection system 10. However, the potential energy measure PE* appears to be beneficial for the subset of roll event cases exhibiting intermediate actuator firing times.

The figure-of-merit FOM is then given by:

$$FOM(n^M)=|R(n^M)|\cdot(|R(n^M)|-|R(n^M-1)|)$$

The figure-of-merit FOM is calculated from the absolute values of the associated $R(n^M)$ and $R(n^M-1)$ terms so that the figure-of-merit FOM is independent of the direction of roll. The term $(|R(n^M)|-|R(n^M-1)|)$ provides a measure of the derivative or slope of the measure function R with respect to time, wherein the actual slope would be given by dividing this term by the sampling period dt (a constant in uniformly sampled data systems). This slope factor, in combination with a threshold function described below, has the effect of requiring the figure-of-merit FOM to increase with time in order for a rollover event to be detected and for a resulting associated deployment of one or more safety restraint actuators 30.

Alternatively, and particularly for relatively small values of $(|R(n^M)|-|R(n^M-1)|)$, the figure-of-merit FOM may be given by:

$$FOM(n^M)=|R(n^M)|$$

Following the algorithm calculations of step (322.1), the algorithm detection criteria evaluated in step (330.1) comprise a plurality of detection conditions, for example, as illustrated in FIG. 8c. If all of the detection conditions are satisfied—so that generally a measures event threshold is exceeded—then a rollover is considered likely to occur, and if in step (340), an associated safing criteria is satisfied from the safing algorithm 200, then in step (350), the associated one or more safety restraint actuators 30 are deployed so as to mitigate injury to the associated occupant or occupants. The detection criteria are established in accordance with a particular detection philosophy. Ideally, the detection criteria would provide for detection of any roll event for which there would be a head contact with the interior of the vehicle (i.e. a "head closure") of sufficient severity that injury to the occupant therefrom would be mitigated by a timely deployment of the associated one or more safety restraint actuators 30; and would provide for ignoring other events. However, if such ideal performance is not feasible, then the detection criteria can be adapted to provide a suitable compromise. For example, in order to detect severe roll events sufficiently fast—i.e. sufficiently sooner than the associated head closure time so that the associated one or more safety restraint actuators 30 can be actuated in time, and at a rate, so as to mitigate risk of injury to the occupant—it may be necessary to accept deployment of the associated one or more safety restraint actuators 30 responsive to severe rollover events that do not completely roll the vehicle (e.g. curb trip or mid-to-high-g deceleration type roll events).

As a first detection condition of step (330.1), the measures event time $\Delta t^M$ is tested to be within a range of measures event times $(\Delta t^M_{min}, \Delta t^M_{max})$, as follows:

$$\Delta t^M_{min} \leq \Delta t^M \leq \Delta t^M_{max}$$

For example, the associated minimum and maximum event times for one particular class of vehicles are $$\Delta t^M_{min} = 40 \text{ milliseconds and } \Delta t^M_{max} = 165 \text{ milliseconds}$$

so that the period of time elapsed since the event trigger falls within a particular time window. The minimum measures event time $\Delta t_{min}^{Mn}$ constraint prevents hard lateral input force events of very short duration from causing an inadvertent detection, while allowing for a sufficiently early safety restraint deployment to satisfy the earliest observed head closure times. (The head closure time is the time at which the head of an occupant contacts the interior of the vehicle). Typically, for severe curb trip or deceleration sled events, the roll discrimination algorithm entrance time would occur about 20 milliseconds after the start of the roll event (i.e. the beginning of the physical event). The earliest that the roll discrimination algorithm could begin to deploy the airbags would then be about 60 milliseconds after the start of the roll event (entrance time plus 40 milliseconds). The fastest observed head closure times are on the order of 115 milliseconds after the start of the roll event. Given that the associated data processing and safety restraint deployment (e.g. airbag inflation) takes about 30 milliseconds, the safety restraint actuator 30 would be fully deployed for these cases at about 90 milliseconds after the start of the roll event. The minimum fire time $\Delta t^{min}$ ensures that the information provided in the signals from lateral accelerometer 18 and angular rate sensor 20 has been utilized as much as possible while still enabling a deployment decision to be made in time to avoid head closure for severe events. The maximum firing time $\Delta t^{max}$ reduces the vulnerability of the roll discrimination algorithm to concatenated events, and may also enable the roll discrimination algorithm to reset and catch a second "real" initiator of a rollover in an accident where the second of two time-separated lateral events leads to rollover. If, in step (330.1), the measures event time $\Delta t^M$ is within the specified range, then the first detection condition is met, and additional detection criteria are evaluated in step (330.1). Otherwise, the process continues with step (150) for the next iteration.

As a second detection condition of step (330.1), the figure-of-merit FOM is compared with a threshold function $FOM^{Thr}(\Delta t^M)$ that, for the exemplary vehicle platform, provides for sufficiently fast discrimination times for substantially all events as necessary in accordance with the above-described detection philosophy. The threshold function $FOM^{Thr}(\Delta t^M)$, for example, has the following form:

$$FOM^{Thr}(\Delta t^M) = A \cdot \Delta t^M + B$$

The associated second detection condition is given by:

$$FOM(n^M) > FOM^{Thr}(\Delta t^M)$$

For example, based upon data from a set of rollover tests of a particular type of vehicle, A and B were given as $A=6.46*10^{11}$ ($g^2 deg^6 / ms*s^4$) and $B=-2.34*10^{13}$ ($g^2 deg^6/s^4$) for (40 milliseconds $\leq \Delta t^M < 96$ milliseconds), and as $A=2.59*10^{11}$ ($g^2 deg^6/ms*s^4$) and $B-1.36*10^{13}$ ($g^2 deg^6/s^4$) for (96 milliseconds $\leq \Delta t^M \leq 165$ milliseconds). The figure-of-merit FOM and the threshold function $FOM^{Thr}(\Delta t^M)$, for example, both have engineering units of [$g^2 deg^6/s^4$]. Generally, different types of vehicles would have either different parameter values or different functional forms for the threshold function $FOM^{Thr}(\Delta t^M)$. A multi-segmented threshold function $FOM^{Thr}(\Delta t^M)$, e.g. comprising a plurality of linear segments, has been found to be beneficial to the performance of the roll discrimination algorithm. The above exemplary threshold line was developed from data that was sampled at a rate of 1250 Hz for a time step of 0.8 milliseconds. The threshold function $FOM^{Thr}(\Delta t^M)$ would be different for different data sampling rates because of differences in the resultants of integrations involved in calculating the figure-of-merit FOM. Generally, the threshold function $FOM^{Thr}(\Delta t^M)$ could be represented by either a function of time, a piecewise function of time, or a table lookup with respect to time. Furthermore, whereas the threshold function $FOM^{Thr}(\Delta t^M)$ is generally a function of time—e.g. time period since inception—, it should be understood that this threshold function $FOM^{Thr}(\Delta t^M)$ could in some cases be constant, i.e. constant with respect to time. If, in step (330.1), the figure-of-merit FOM exceeds the threshold function $FOM^{Thr}(\Delta t^M)$, then the second detection condition is met, and additional detection criteria are evaluated in step (330.1). Otherwise, the process continues with step (150) for the next iteration.

As a third detection condition of step (330.1), the figure-of-merit FOM is tested to see if it is increasing in magnitude with respect to time at the time of prospective deployment of the safety restraint actuator(s) 30, as follows:

$$|FOM(n^M)| > |FOM(n^M-1)| \text{ AND}$$

$$|FOM(n^M)| > |FOM(n^M-m)|, \text{ where } m > 1, \text{ e.g. } m=6$$

The third detection condition is intended to prevent deployment in cases, for example, for which the threshold function $FOM^{Thr}(\Delta t)$ is exceeded, e.g. at $\Delta t=40$ milliseconds, but for which the event was decaying away (e.g. for which the magnitude of either $A_y$ or $\omega_x$ or both was decreasing). If, in step (330.1), the figure-of-merit FOM is increasing with respect to time, then the third detection condition is met and additional detection criteria are evaluated in step (330.1). Otherwise, the process continues with step (150) for the next iteration.

As a fourth detection condition of step (330.1), the magnitude of the compensated lateral acceleration component $A'_y$ at the time of prospective deployment of the safety restraint actuator(s) 30) is compared with a second acceleration threshold $$A_y^{Thr\_2},$$

as follows:

$$|A'_y(n^M)| > A_y^{Thr\_2}$$

The fourth detection condition prevents a failure of the angular rate sensor 20 in a mode that causes a large, false compensated angular velocity $\omega'_x$ signal from causing an inadvertent deployment of the safety restraint actuator(s) 30. For example, a second acceleration threshold $$A_y^{Thr\_2}$$

value of 0.7 g would likely not be exceeded during normal driving conditions for which there is no lateral tire slip on the driving surface. If, in step (330.1), the magnitude compensated lateral acceleration component $A'_y$ greater than the second acceleration threshold $$A_y^{Thr\_2},$$

then the fourth detection condition is met and additional detection criteria are evaluated in step (330.1). Otherwise, the process continues with step (150) for the next iteration.

As a fifth detection condition of step (330.1), the magnitude of the compensated angular velocity $\omega'_x$ is compared with an associated second roll rate threshold $\omega^{Thr\_2}$ at the time of prospective deployment of the safety restraint actuator(s) 30, as follows:

$$|\omega'_x(n^M)| > \omega^{Thr\_2}$$

For example, the second roll rate threshold $\omega^{Thr\_2}$ is about 50 degrees/second. The fifth detection condition ensures that the vehicle 12 is experiencing significant angular velocity at the time of deployment of the safety restraint actuator(s) 30. The second and fifth detection conditions in combination prevent severe side impact events from deploying the safety restraint actuator(s) 30. The fifth detection condition also prevents a failed lateral accelerometer 18—indicating a large, false lateral acceleration signal—from causing an inadvertent deployment of the safety restraint actuator(s) 30. If, in step (330.1), the magnitude of the compensated angular velocity $\omega'_x$ is greater than the second roll rate threshold $\omega^{Thr\_2}$, then the fifth detection condition is met, and the process continues with step (340). Otherwise, the process continues with step (150) for the next iteration.

The herein-described measures algorithm 300.1 has been successfully tested with data from a series of vehicle rollover tests, and has been demonstrated to provide a reliable prediction of eventual vehicle rollover. For roll events caused by high lateral acceleration, predictions can be made relatively quickly, which enables the measures algorithm 300.1 to deploy the airbags before head closure for the type of roll events where head closure typically occurs most rapidly. Generally, the measures algorithm 300.1 is beneficial in providing relatively early rollover detection and relatively early time-to-fire (TTF's) of the associated safety restraint actuator(s) 30, for short and medium time roll events, similar to curb trip and high-g lateral deceleration type events.

Accordingly, the rollover detection system 10 incorporating the measures algorithm 300.1 provides for improved discrimination of vehicle rollover that allows for rollover airbag deployment times that meet occupant head closure times while minimizing inadvertent deployments, by:

utilizing the measured lateral acceleration to aid in predicting future (20-30 ms later) roll motion;

combining lateral acceleration with angular speed and total rotation angle to produce a measure of the current rotation state and dynamics, and the forcing function that is producing the rotation, without requiring the use of initial vehicle angle information for roll events where the starting angle is less than about 20 degrees from horizontal; and utilizing vehicle specific dynamics properties (as derived from rollover test data) combined with early measured vehicle responses to allow for a prediction of eventual vehicle rollover before such outcome is definitive.

Referring to FIGS. 10 four different vehicle test conditions—designated as Test A, Test B, Test C and Test D, are tabulated for purposes of illustrating and comparing the measures algorithm 300.1 and the energy algorithm 300.2 (the energy algorithm 300.2 is described more fully hereinbelow). Tests A and B are corkscrew type tests, which illustrate conditions for which the energy algorithm 300.2 exhibits faster rollover detection than the measures algorithm 300.1, and Tests C and D are deceleration sled tests for which the measures algorithm 300.1 exhibits faster rollover detection than the energy algorithm 300.2. The vehicle rolled over in Tests A and D, but did not roll over in Tests B and C, but rather achieved a maximum roll angle of 37 and 34 degrees respectively. The initial vehicle speed, average vehicle deceleration, and associated detection and event times are also tabulated in FIG. 10, wherein the head closure time is the time at which the head of the occupant (dummy) actual struck the interior of the vehicle.

Referring to FIGS. 11a-d, the filtered roll rate (angular rate) from an angular rate sensor 20, roll angle, and filtered lateral acceleration from a lateral accelerometer 18 are illustrated as a function of time for each of Tests A-D respectively in accordance with the conditions that are tabulated in FIG. 10.

Figure 12:
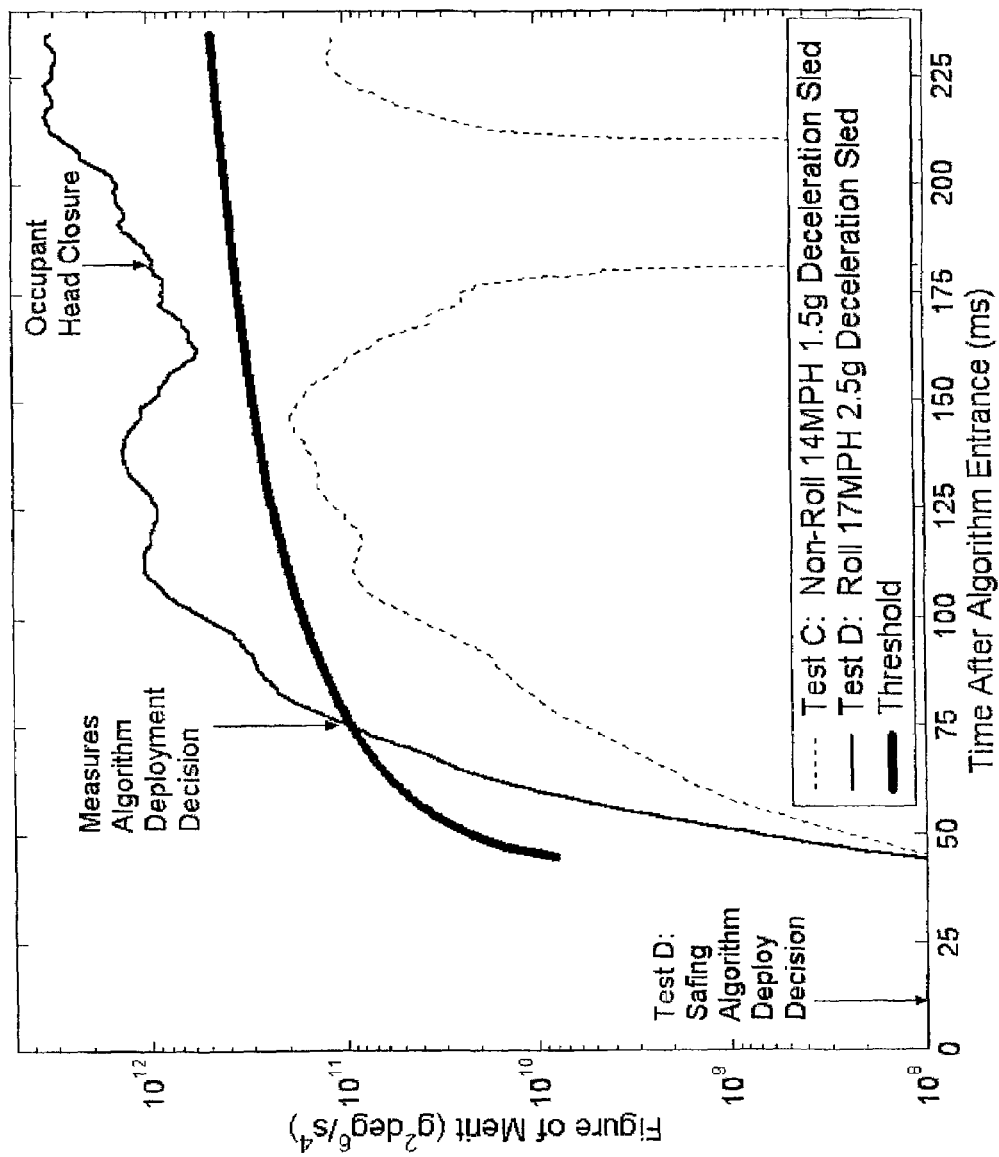
FIG. 12 illustrates plots of a figure-of-merit and an associated deployment threshold for a rollover measure as a function of time, in accordance with a measures algorithm, for the rollover event of Test D and the non-rollover event of Test C.

Referring to FIG. 12, the calculated figure-of-merit FOM is plotted for Tests C and D as a function of measures event time $\Delta t^M$, i.e. the time since inception of the measures algorithm 300.1 for actual sled deceleration tests of a particular type of vehicle in accordance with the table of FIG. 10. FIG. 12 also illustrates an associated threshold function $FOM^{Thr}(\Delta t^M)$ for the particular type of vehicle. Test D caused the vehicle to rollover and Test C reached a maximum rotation angle of about 34 degrees. The figure-of-merit $FOM(n^M)$ calculated by the herein-described measures algorithm 300.1 in conjunction with the associated threshold function $FOM^{Thr}(\Delta t^M)$, enabled a firing time (TTF) of 98 milliseconds after inception of the roll event for test D, for which the vehicle rolled over, which was substantially before the associated head closure time of 196 milliseconds, thereby providing 98 milliseconds within which to deploy the associated one or more safety restraint actuators 30. The safing criteria of associated safing algorithm 200 were satisfied 26 milliseconds after inception of the roll event, which was substantially before the detection criteria was satisfied by the measures algorithm 300.1. By comparison, the detection criteria of the hereinbelow described energy algorithm 300.2 were not satisfied for the event of Test D until 594 milliseconds after inception of the roll event, which was substantially after the associated head closure time, thereby illustrating the benefit of the measures algorithm 300.1 for the roll event of Test D.

Referring to FIG. 6, FIGS. 8a-c, and FIGS. 9a-b, the energy algorithm 300.2 will now be discussed with greater particularity, wherein the steps of FIG. 6 are suffixed with "0.2" to indicate their association therewith. The ONGOING_EVENT_FLAG for energy algorithm 300.2—referred to as the ONGOING_ENERGY_EVENT_FLAG—is set in step (308.2) upon satisfaction of the entrance criteria in step (306.2), and is reset in step (320.2) upon satisfaction of the exit criteria in step (322.2). The ONGOING_ENERGY_EVENT_FLAG, for example, could correspond to a particular location in the memory 28 of the associated processor 26 that implements the energy algorithm 300.2. After entry following step (306.2), the energy algorithm 300.2 is not subsequently exited until either the energy event exit criteria is satisfied in step (322.2), or until a roll event is detected causing a deployment of the safety restraint actuators 30. Moreover, after the energy event exit criteria is satisfied and the energy algorithm 300.2 is exited, the energy algorithm 300.2 can be subsequently reentered if the associated energy event entrance criteria is subsequently satisfied.

The energy algorithm 300.2 utilizes the angular velocity $\omega_x$ signal from angular rate sensor 20 to determine the roll state of the vehicle and compare the total energy (rotational kinetic and potential) of the vehicle 12 with that needed to completely roll.

In step (306.2), the entrance criteria of the energy algorithm 300.2 is, for example, that the magnitude of the compensated lateral acceleration component $A'_y$ be greater than a first acceleration threshold $$A_y^{Thr\_1},$$

OR that the magnitude of the compensated angular velocity $\omega'_x$ be greater than a first roll rate threshold $\omega^{Thr\_1}$ i.e.:

$$|A'_y(n^E)| > A_y^{Thr\_1}$$

OR $$|\omega'_x(n^E)| > \omega^{Thr\_1}$$

For an example of a particular type of vehicle, based upon actual rollover data, the first acceleration threshold $$A_y^{Thr\_1}$$

was set to about 1.4 g (as for the measures algorithm 300.1) and the first roll rate threshold $\omega^{Thr\_1}$ was set to about 19 degrees/second. It should be recognized that this threshold value, as well as the value of the other parameters of the energy algorithm 300.2, is generally dependent upon the characteristics of the particular associated vehicle 12 or class of vehicles, and that the particular value used for a particular rollover detection system 10 can be adjusted for improved discrimination dependent upon the nature of the associated vehicle 12 or class of vehicles.

In step (310.2), upon initial entrance to the energy algorithm 300.2 following step (306.1), the energy algorithm 300.2 is initialized. An event sample count $n^E$ and the value of angular position $\theta^E(-1)$ are initialized—e.g. to values of zero. Also the sampled time $t^E(-1)$ just prior to the time of event entrance is initialized to a value of the time of energy event entrance $t^E(0)$, which is initialized to a value of the current time t; and the time period $\Delta t^E(0)$ since algorithm entrance is initialized to a value of zero. Furthermore, a second event sample count $n_\omega^E$ is initialized to zero, as is a time period $\Delta t^{E*}$ since roll direction change. The superscript "E" used herein refers to variables associated with the energy algorithm 300.2.

Upon subsequent iteration of the energy algorithm 300.2, if, in step (304.2), the ONGOING_ENERGY_EVENT_FLAG is set, then, in step (312.2), the event sample count $n^E$ is incremented, the associated current sampled time $t^E(n^E)$ is set equal to the current time t, and the energy event time $\Delta t^E$ is calculated as the period extending from the time of energy event entrance $t^E(0)$ to the current time $t^E(n^E)$ as follows:

$$\Delta t^E(n^E) = t^E(n^E) - t^E(0)$$

In step (322.2), one exit criteria of the energy algorithm 300.2 is, for example, that the energy event time $\Delta t^E$ be greater than a maximum time period threshold $$\Delta t_{max}^E,$$

i.e.:

$$\Delta t^E(n^E) > \Delta t_{max}^E$$

Another exit criteria of the energy algorithm 300.2 is, for example, that the energy event time $\Delta t^E$ be greater than a minimum time period threshold $$\Delta t_{min}^E,$$

and that the time period since the entrance criteria of step (306.2) was most recently satisfied is greater than a second time period threshold $$\Delta t_{Event}^E,$$

i.e., as follows:

$$\Delta t^E(n^E) > \Delta t_{min}^E \text{ AND } \Delta t^E(n^E) - \Delta t^{E*} > \Delta t_{Event}^E$$

The energy algorithm 300.2 requires a substantially longer period of time than the measures algorithm 300.1 before being restarted (i.e. exited and reset) because of possibility of relatively slow rollover events. For the example of a particular type of vehicle, based upon actual rollover data, the time period threshold $$\Delta t_{max}^E$$

was set to about 12 seconds, the minimum time period threshold $$\Delta t_{min}^E$$

was set to about 4 seconds, and the second time period threshold $$\Delta t_{Event}^E$$

was set to about 2 seconds. Accordingly, for this example, the energy algorithm 300.2 is executed for at least 4 seconds but not more than 12 seconds, and subject to these limitations, is exited if the time period since the entrance criteria was most recently satisfied exceeds 2 seconds. Upon exit from the energy algorithm 300.2, the ONGOING_ENERGY_EVENT_FLAG is reset in step (320.2), after which a subsequent satisfaction of the entrance criteria in step (306.2) causes the variables associated with the energy algorithm 300.2 to be initialized in step (310.2).

If, in step (322.2), the exit criteria is not satisfied, then the algorithm calculations are updated in step (326.2) for the particular iteration of the energy algorithm 300.2, as follows.

First the angular position $\theta^E$ is estimated by integrating the signed value of the compensated angular velocity $\omega'_x$ as follows:

$$\theta^E(n^E) = \theta^E(n^E - 1) + \omega'_x(n^E) \cdot dt$$

wherein the integration time step dt is given by the difference between the time $t^E(n^E)$ at the current iteration, and the time at the previous iteration $t^E(n^E-1)$—which difference would be constant for a uniform sampling rate—as follows:

$$dt = t^E(n^E) - t^E(n^E - 1)$$

and the compensated angular velocity $\omega'_x$ is given by:

$$\omega'_x(t) = \tilde{\omega}_x(t) - \tilde{\omega}_x^{Offset}(t)$$

In step (326.2), the algorithm calculations are further adapted to compensate for offsets in the angular velocity $\omega_x$ signal due either to gyroscope error, or to an offset as a result of significant vehicle motion, that may not otherwise be adequately compensated in the compensated angular velocity $\omega'_x$, particularly for rough road conditions for which the angular velocity $\omega_x$ signal may exhibit substantial oscillatory behavior. The energy algorithm 300.2 does not exit for at least $$\Delta t_{Event}^E$$

seconds, e.g. 2 seconds, following the most recent time at which the algorithm entrance criteria were satisfied, which thereby provides for extending the duration of the energy algorithm 300.2 for up to $$\Delta t_{max}^E$$

seconds, e.g. 12 seconds, which can lead to a substantial roll angle integration errors (e.g. 24 to 36 degrees) for a relatively small offset—e.g. 2-3 degrees/second—in the signal from the angular rate sensor 20. On a rough road, the vehicle 12 can exhibit substantial oscillatory roll motion, and a "rough road event" would be characterized by an angular velocity $\omega_x$ that oscillates about the true angular velocity offset $$\tilde{\omega}_x^{Offset}(t).$$

Figure 13:
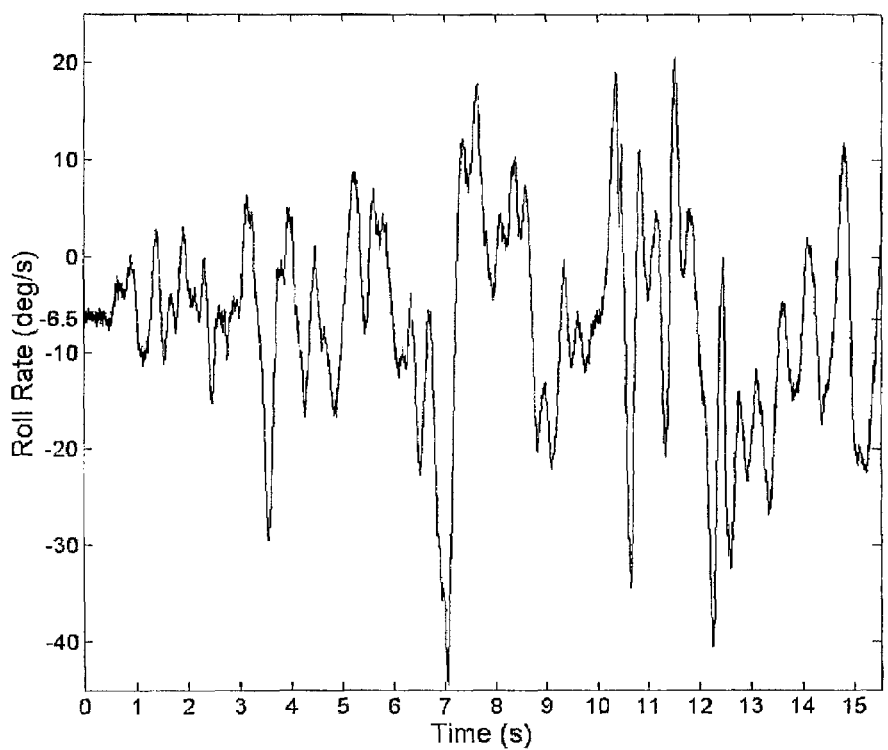
FIG. 13 illustrates a plot of roll rate as a function of time for a signal having a roll rate offset.

For example, referring to FIG. 13, an angular velocity $\omega_x$ signal having a true angular velocity offset $$\tilde{\omega}_x^{Offset}(t) \text{ of } -6.5$$

degrees/second is plotted as a function of time. Because typical roll events do not exhibit a change in sign of compensated angular velocity $\omega'_x$ during the roll event, it is possible to recognize a rough road condition from oscillation in the compensated angular velocity $\omega'_x$ signal. Under these conditions, the integrated roll angle $\theta^E$ is damped toward zero degrees every time the compensated angular velocity $\omega'_x$ changes sign, according to the following equation:

$$\theta^E(n^E) = \theta^E(n^E - 1) \cdot \text{MAX}\left(\frac{1024 - (n^E - n_\omega^E)}{1024}, 0.5\right) \text{ and } n_\omega^E = n^E$$

wherein the counter $n_\omega^E$ is set equal to the event sample count $n^E$ at the time of reversal, which provides for damping the roll angle $\theta^E$ by an amount between 0.1% and 50% each time the compensated angular velocity $\omega'_x$ changes direction, depending upon the period of time since the most recent change of direction.

Figure 14:
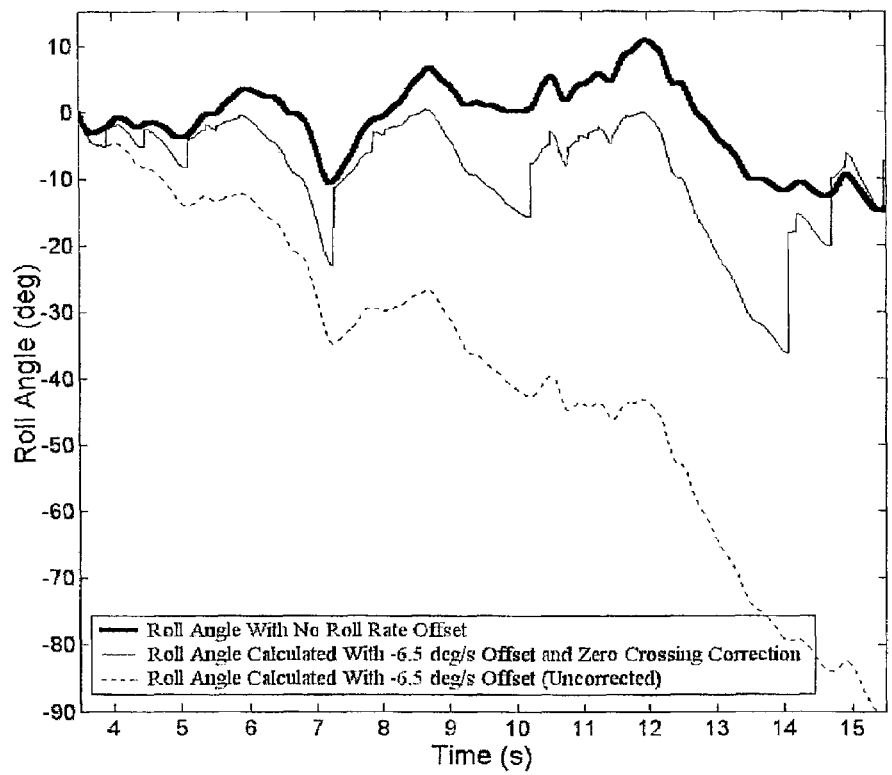
FIG. 14 illustrates plots of roll angle as a function of time based upon the data of FIG. 13, for various associated processes for determining roll angle from roll rate.

Referring to FIG. 14, the affect of the above-described compensation for the roll oscillation effect is illustrated, wherein the roll angle $\theta^E$, integrated from the angular velocity $\omega_x$ (roll rate) data plotted in FIG. 13, is plotted as a function of time for various conditions. As the first condition, the true angular velocity offset $$\tilde{\omega}_x^{Offset}$$

of −6.5 degrees/second is removed prior to integration. As the second condition, the roll angle $\theta^E$ is integrated from the biased angular velocity $\omega_x$ data, and then compensated for roll oscillation as described hereinabove. As the third condition, the roll angle SE is integrated from the biased angular velocity $\omega_x$ data without the above-described compensation for roll oscillation, which illustrates the potential for false detection of a roll event as a result of an uncompensated angular velocity $\omega_x$, bias for relatively long integration intervals. The above-described compensation for roll oscillation substantially corrects for roll-oscillation induced integration errors, without adversely affecting the detection of an actual roll event for which the angular velocity $\omega_x$ is substantially unidirectional.

In step (326.2), the algorithm calculations further provide for recording the latest time at which the entrance criteria of step (306.2) are satisfied, so as to provide a supplemental basis for the exit criteria of step (322.2), as follows:

$$|A'_y(n^E)| > A_y^{Thr\_1} \text{ OR } |\omega'_x(n^E)| > \omega_x^{Thr\_1}$$

Following the algorithm calculations of step (322.2), the algorithm detection criteria evaluated in step (330.2) comprise a plurality of detection conditions, for example, as illustrated in FIG. 8c. If all of the detection conditions are satisfied—so that generally an energy event threshold is exceeded—then a rollover is considered likely to occur, and if in step (340), an associated safing criteria is satisfied from the safing algorithm 200, then in step (350), the associated one or more safety restraint actuators 30 are deployed so as to mitigate injury to the associated occupant or occupants. The detection criteria of the energy algorithm 300.2 are established in accordance with a detection philosophy similar to that described hereinabove for the measures algorithm 300.1.

Figure 15:
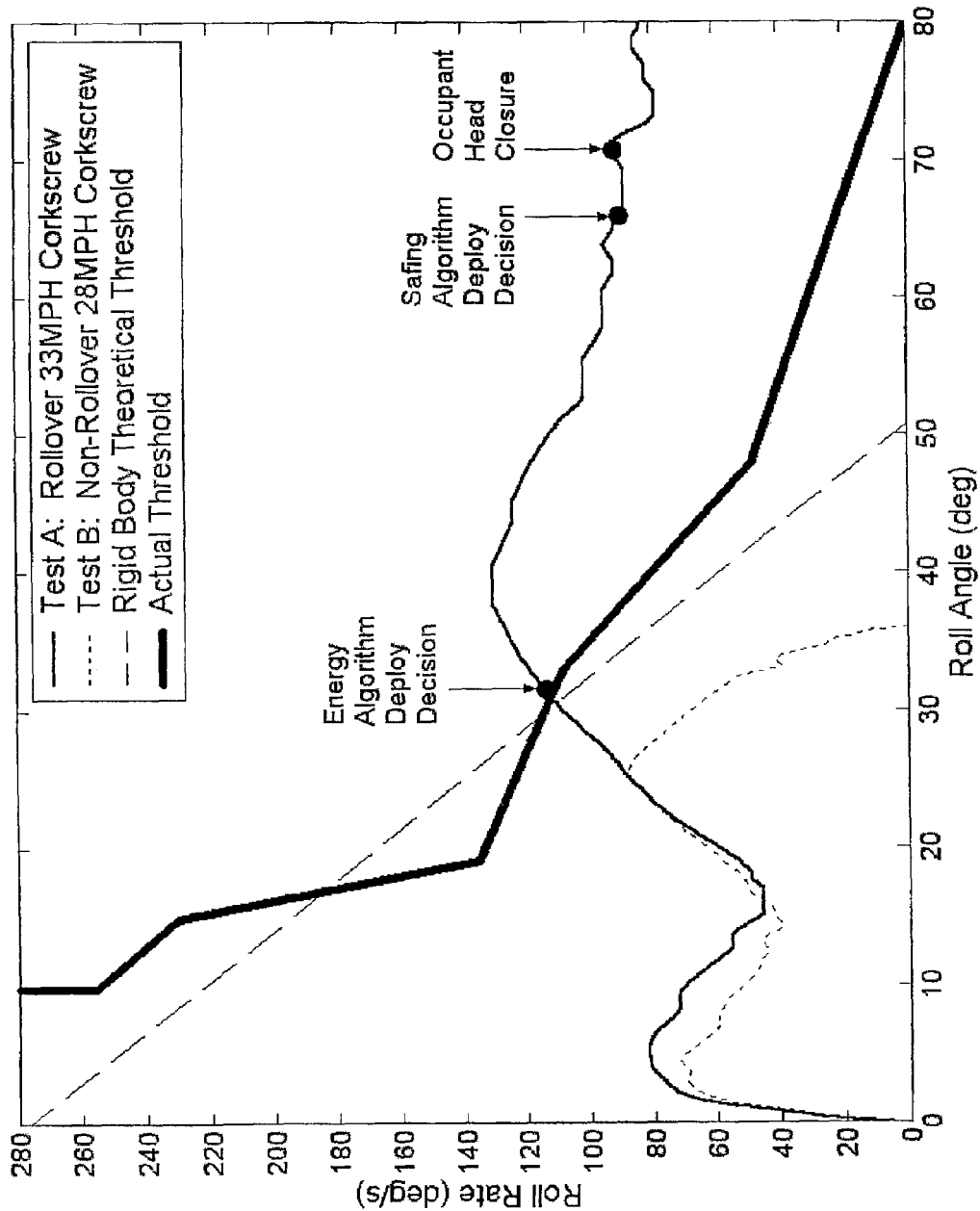
FIG. 15 illustrates plots of roll rate as a function of roll angle, and plots of associated rollover thresholds, in accordance with an energy algorithm, for the rollover event of Test A and the non-rollover event of Test B.

The principal detection criteria of the energy algorithm 300.2 are based upon the behavior of the compensated angular velocity $\omega'_x$ and roll angle $\theta^E$, and the associated trajectory thereof, in the associated phase-space of angular velocity and roll angle (i.e. the $\omega$-$\theta$ phase-space). An example of the $\omega$-$\theta$ phase-space is illustrated in FIG. 15.

In accordance with rigid body dynamics, there exists a theoretical threshold boundary in phase-space that distinguishes between roll and non-roll events of an associated rigid body. For example, this theoretical threshold boundary is given by:

$$\omega^{Thr}(\theta) = \sqrt{\frac{2mg \cdot \left[\frac{T^2}{4} + h_{CG}^2\right]^{\frac{1}{2}} \cdot \left[1 - \sin\left(\theta + \tan^{-1}\left(\frac{2h_{CG}}{T}\right)\right)\right]}{I}}$$

where mg is the weight of the vehicle, T is the vehicle track width, 1 is the vehicle moment of inertia in roll, and $h_{CG}$ is the height of the vehicle center of gravity. This equation is nearly linear in the $\omega$-$\theta$ plane over the region of interest. However, because of non-rigid body effects, the practical threshold boundary is beneficially modeled as a piecewise-linear boundary comprising, for example, a series of about 5 or 6 connected line segments that generally follow the above theoretical threshold boundary, but which can be tailored for a particular vehicle 12 or vehicle platform to improve discrimination between roll and non-roll events. Generally, this boundary could be represented by either a function in phase-space (e.g. a function of roll angle $\theta$), a piecewise function in phase-space (e.g. a piecewise function of roll angle $\theta$), or a table lookup in phase-space. Referring to FIG. 15, actual rollover test data—filtered using the hereinabove-described running average filter—for Tests A and B of FIGS. 11a and 11b respectively, in accordance with the conditions of FIG. 10, is plotted in the $\omega$-$\theta$ phase-space, together with an example of the associated theoretical threshold boundary and an example of a practical, piecewise-linear threshold boundary.

The distance between the current ordered pair $(\omega'_x(n^E), \theta^E(n^E))$ and the linear segment of the practical threshold boundary is calculated for each iteration for the linear segment whose associated endpoint angle values $\theta_k, \theta_{k+1}$ bound the current roll angle $\theta^E(n^E)$. Each linear segment of the practical threshold boundary is defined by its endpoints $(\omega_k, \theta_k)$ and $(\omega_{k+1}, \theta_{k+1})$. The distance D between the current ordered pair and the appropriate linear segment of the practical threshold boundary is given by:

$$D(\tilde{\omega}_x, \theta^E, n^E, k) = \frac{\left[(\omega_{k+1} - \omega_k) \cdot (\theta^E(n^E) - \theta_k) - (\theta_{k+1} - \theta_k) \cdot (|\omega'_x(n^E)| - \omega_k)\right]}{\sqrt{(\theta_{k+1} - \theta_k)^2 + (\omega_{k+1} - \omega_k)^2}}$$

whereby, if this distance is less than zero, then the practical threshold boundary has been crossed.

The slope of the trajectory of $(\omega'_x(n^E), \theta^E(n^E))$ in the $\omega$-$\theta$ phase-space is given by:

$$\text{Slope}(n^E) = \frac{\omega'_x(n^E) - \omega'_x(n^E - 1)}{\theta^E(n^E) - \theta^E(n^E - 1)}$$

and the associated angle of this slope in the $\omega$-$\theta$ phase-space is given by:

$$\beta = \tan^{-1}\left(\text{Slope}(n^E) \cdot \frac{180}{\pi}\right)$$

If, in step (330.2), the angle $\beta$ is within limits (i.e. $\beta^{min} < \beta < \beta^{max}$, where e.g. $\beta^{min}=75$ degrees and $\beta^{max}=90$ degrees), the magnitude of the roll rate is increasing with time (i.e. $|\omega'_x(n^E)| - |\omega'_x(n^E-1)| > 0$), the distance to the practical threshold boundary is less than zero (i.e. $D(\tilde{\omega}'_x, \theta^E, n^E, k) < 0$) and the roll angle $\theta^E$ is greater than a roll angle threshold $\theta^{Thr}$ (i.e. $|\theta^E| > \theta^{Thr}$, where e.g. $\theta^{Thr}=10$ degrees), then the energy detection criteria are satisfied. Alternatively, the energy detection criteria are satisfied if the distance in $\omega$-$\omega$ phase-space is less than a threshold $D^{Thr}$ (i.e. $D(\tilde{\omega}'_x, \theta^E, n^E, k) < D^{Thr}$, where e.g. $D^{Thr}=-2.5\sqrt{\text{deg}^2+(\text{deg/sec})^2}$) and the roll angle $\theta^E$ is greater than the roll angle threshold $\theta^{Thr}$ (i.e. $|\theta^E| > \theta^{Thr}$) If the energy detection criteria are satisfied in step (330.2), and if, in step (340), the safing criteria are satisfied, then, in step (350), the associated one or more safety restraint actuators 30 are deployed so as to mitigate injury to the associated occupant or occupants.

The energy algorithm 300.2 deployment decision is not latched, so that, if the safing criteria has not been satisfied by the time the detection criteria of the energy algorithm 300.2 is satisfied, then the energy algorithm 300.2 continues to be iterated until either the safing criteria is satisfied, or the energy algorithm 300.2 is otherwise exited in step (322.2)

It should be understood that the measures algorithm 300.1 and the energy algorithm 300.2 can be executed in series or in parallel, on a common processor 26 or on separate processors 26. If executed in series, then the steps illustrated in FIG. 6 for one iteration are completed for one of the algorithms, then the other algorithm would commence with either step (302) for the first pass, or step (150) for subsequent passes.

Whereas the rollover detection algorithm has been illustrated with equations in a particular form, it should be understood that these calculations may be implemented on a particular processor 26 in a variety of ways without departing from the scope of the teachings herein. For example, the particular calculations described herein may require modification in order to be practically implemented on a particular processor, for example, depending upon the resolution of associated analog-to-digital converters, and the type and precision of mathematical operations that can be performed by the particular processor 26, and the preferred word size of the particular processor 26.

Whereas the roll discrimination algorithm is illustrated herein as applied to sampled data, it should be understood that the algorithm could also be implemented continuously, for example using an analog processor. Moreover, it should be understood that the event sample count $n^M$ may be either explicit or implicit in the actual implementation of the roll discrimination algorithm, and that the associated time-dependent variables can be expressed as functions of either time t or event sample count $n^M$, $n^E$.

Whereas the measures algorithm 300.1 and the energy algorithm 300.2 have been illustrated as utilizing a measure of roll angle that is found by integrating the associated compensated angular velocity $\omega'_x$, it should be understood that a measured roll angle, e.g. from an incline sensor, could be used instead of a calculated roll angle.

Figure 16:
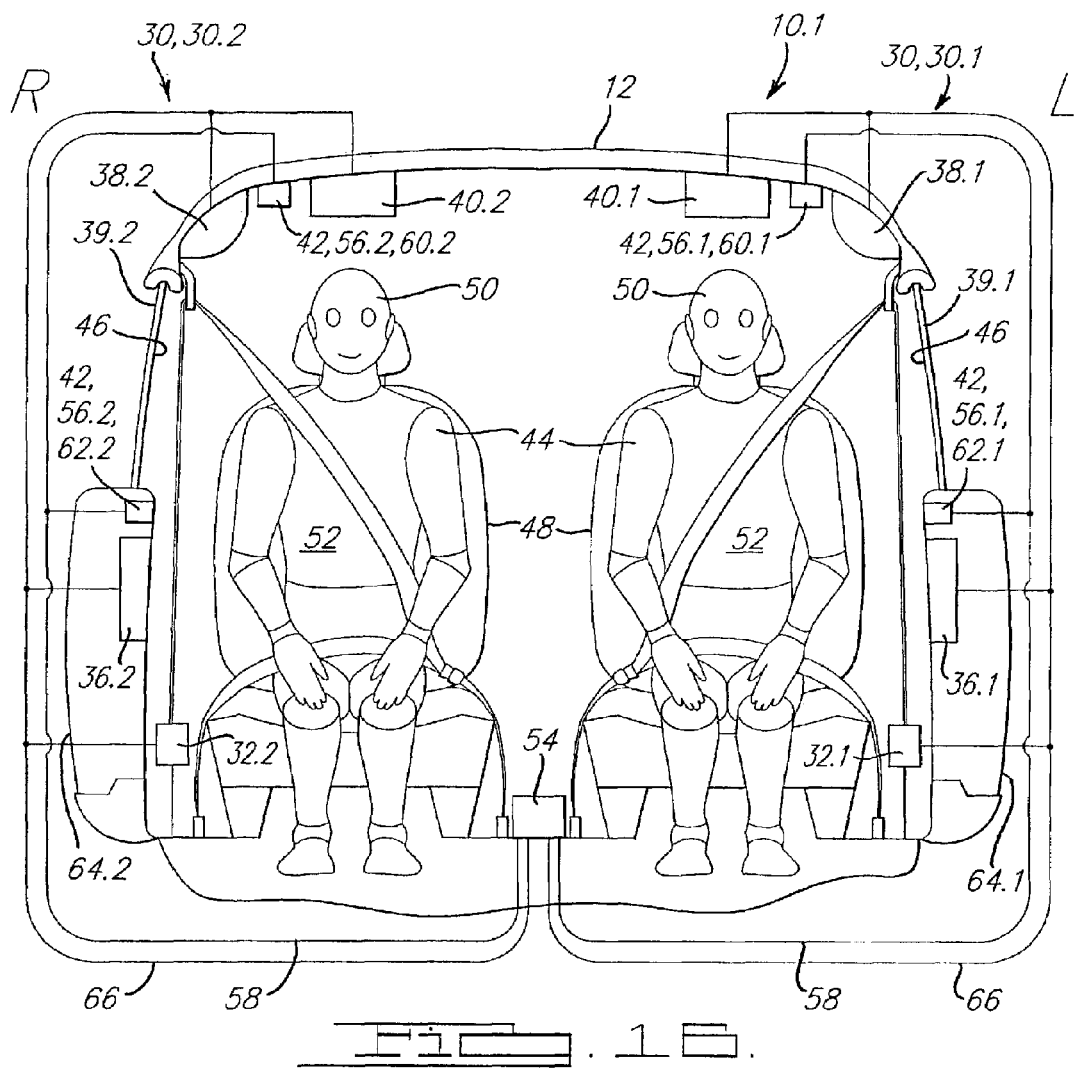
FIG. 16 illustrates a front view of a passenger compartment of a vehicle, and a block diagram of another embodiment of a rollover detection system.
Figure 17:
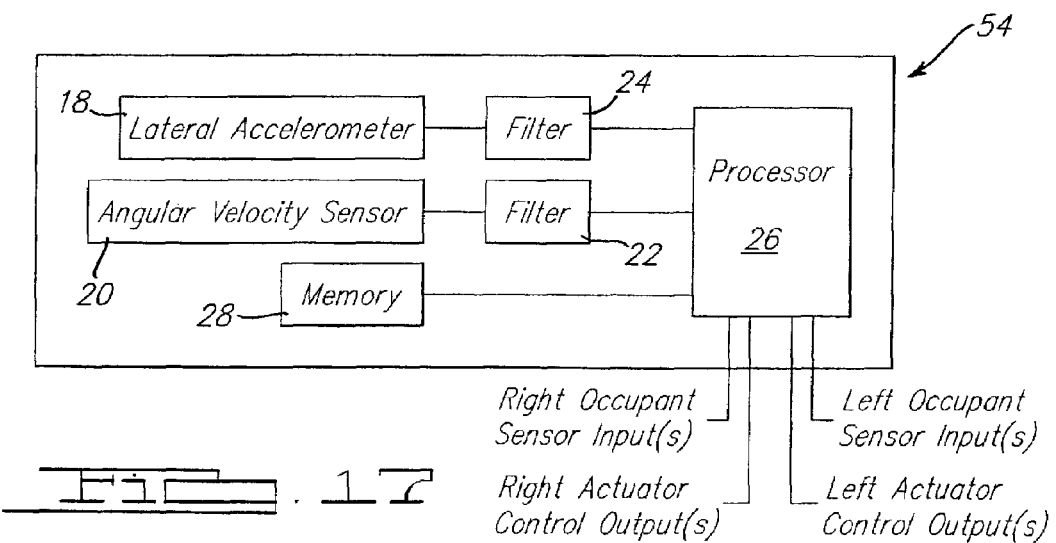
FIG. 17 illustrates a block diagram of a controller in accordance with the rollover detection system illustrated in FIG. 16.

Referring to FIGS. 16 and 17, in accordance with another embodiment, a rollover detection system 10.1 comprises the rollover detection system 10 as illustrated in FIG. 2 and described hereinabove, and further comprises an occupant detection system 42 that is adapted to sense the proximity of an occupant 44 to one or more interior sides of the vehicle 12 incorporating associated one or more safety restraint actuators 30 that are provided to mitigate associated rollover induced injury to the occupant 44.

The occupant detection system 42 senses at least the presence of an occupant 44 in a given seating location, and may be further adapted to provide a measure of the proximity or position directly or indirectly—of an occupant 44, or portion thereof e.g. a head portion of an occupant 44—to an associated inner boundary 46 of the vehicle 16, for example, by either measuring the distance by which the occupant is separated from the inner boundary 46, and/or by measuring angle by which the occupant 44 is leaning from vertical—e.g. toward the inner boundary 46—together with a measure of where the occupant is seated on the associated vehicle seat 48. For example, the occupant detection system 42 may provide a measure of the lateral position or distance of the occupant's head 50, or torso 52, relative to the associated inner boundary 46 of the vehicle 12, which can be beneficial in estimating an associated head 50, or torso 52, closure time, i.e. the time at which the occupant's head 50, or torso 52, would likely contact the inner boundary 46 of the vehicle 12. The occupant detection system 42 may incorporate various detection technologies, for example, vision sensing, capacitive sensing, active or passive infrared sensing, laser sensing, optical sensing, radio wave (radar) sensing, microwave sensing, sound wave (ultrasonic) sensing, multi-point seat weight distribution sensing, or electrostatic sensing. For example, in a capacitive sensing system (or electric field sensing system), the associated electrode or electrodes could be placed on either the interior roof or roof rail just above the window or on a pillar (or other fixed position) nearest the occupant to be detected. Alternatively, or additionally, an electrode could be located in either the headrest portion or the upper back portion of the associated vehicle seat 48. As another example, the occupant 44 could be detected with a vision system, for example, incorporating an associated structured light illumination system and an associated camera and image processing system for detecting an object from its interaction with the structured light.

For an occupant detection system 42 that provides a measure of the distance between the occupant's head 50, or torso 52, and the associated inner boundary 46 of the vehicle 12, as a function of time, the associated distance can be tracked over time, and the associated closure time may be estimated therefrom. For example, the associated lateral velocity of the head 50, or torso 52, can be either estimated from the change in associated position with respect to time, or by measuring this velocity directly, e.g. from a Doppler shift of a measurement signal. The associated lateral acceleration of the head 50, or torso 52, can then be estimated from the change in associated velocity with respect to time. For example, the associated velocity can be either continuously estimated or measured, or estimated or measured at discrete intervals. The associated closure time can then be estimated by solving the following equation for time t:

$$D(t) = V_{lateral} * t + \frac{A_{lateral} * t^2}{2}$$

where D(t) is the distance of the head 50, or torso 52 from the associated inner boundary 46, and $V_{lateral}$ and $A_{lateral}$ are the associated velocity and acceleration respectively of the head 50, or torso 52, e.g. using the most recent estimates or measurements of associated distance, velocity and acceleration, wherein acceleration is assumed constant.

The rollover detection system 10.1 incorporates a controller 54, for example, as illustrated in FIG. 17, comprising the lateral accelerometer 18, angular rate sensor 20, filters 22, 24, processor 26, and memory 28 in accordance with the embodiment illustrated in FIG. 2 and described more fully hereinabove.

Sets of left 56.1 and right 56.2 occupant sensors are operatively connected to one or more input ports of the processor 26, for example, via either a signal bus 58, a multiplexed signal line, or a plurality of signal cables. For example, FIG. 17 illustrates an embodiment comprising both left 60.1 and right 60.2 first occupant sensors, e.g. vision sensors located overhead, and left 62.1 and right 62.2 second occupant sensors, e.g. capacitive sensors located in the associated left 64.1 and right 64.2 doors. Whereas each occupant seating location has been illustrated as having associated therewith two different occupant sensors, the particular number of occupant sensors is not considered to be limiting. For example, in another embodiment, there might be only one occupant sensor 56.1, 56.2 at each seating location to be sensed, or there might be more than two occupant sensors associated with any one seating location.

The processor 26 is also operatively connected—e.g. via either a signal bus 66, a multiplexed signal line, or a plurality of signal cables—to associated sets of left 30.1 and right 30.2 safety restraint actuators, for example, left 32.1 and right 32.2 seat belt pretensioners, left 36.1 and right 36.2 thorax air bag inflators, left 38.1 and right 38.2 roll curtains,' left 40.1 and right 40.2 overhead air bag inflators. The processor 26 determines the direction of roll from the associated signals of the angular rate sensor 20 and/or lateral accelerometer 18 so as to provide for deploying one or more safety restraint actuators 30 on the side L, R on which the vehicle 12 is rolling.

Generally, it is desirable to deploy a safety restraint actuator 30 only when necessary, in order to avoid unnecessary associated repair costs, and to avoid potential adverse affects of the deployment on an occupant 44 who is positioned within an "at-risk" zone of a safety restraint actuator 30 that must be sufficiently energetic to protect the occupant 44 in an accident situation. Accordingly, a safety restraint actuator 30 is beneficially deployed in situations for which the benefits of mitigating injury to an occupant—e.g. caused by a head closure with the interior of the vehicle (e.g. window, upper door rail, ceiling) or caused by ejection or partial ejection from the vehicle—outweigh the associated risk of injury from the deployment of the safety restraint actuator 30. For example, the risk of injury by an air bag inflator generally increases as the distance of the occupant from the air bag inflator decreases. Generally, it is beneficial if the associated safety restraint actuator 30 can be fully deployed prior to the interaction thereof with the occupant 44. Different safety restraint actuators 30 can require different amounts of time to deploy.

For example, an air bag inflator may require about 20 milliseconds to inflate, depending upon the size of the associated air bag.

As indicated by the data of FIG. 10, rollover events are generally much slower than frontal or side-impact crashes, thereby providing considerably more time within which to detect the roll event and deploy the associated safety restraint actuator(s) 30. For example, in Test A, head closure did not occur until 368 milliseconds after the energy algorithm 300.2 first detected the roll event, and 59 milliseconds after the saring algorithm 200 confirmed the roll event. In Test D, head closure did not occur until 98 milliseconds after the measures algorithm 300.1 detected the roll event. In both of these cases, there would have been ample time to deploy the associated safety restraint actuator(s) 30 substantially before the associated head closure, so as to improve the likelihood that the associated safety restraint actuator(s) 30 were fully deployed prior to their associated interaction with the occupant 44. However, in some situations—particularly for tripped roll events, e.g. curb-tripped roll events,—it is not possible to detect if complete vehicle rollover will occur before the associated head closure or partial ejection. For example, this may depend upon where the occupant is seated relative to the associated inner boundary 46 of the vehicle 12. In these situations, it may be desirable to actuate the associated safety restraint actuator(s) 30 before they might otherwise be actuated—in order that they be deployed prior to head closure,— at the potential risk of actuation responsive to events for which the vehicle does not ultimately roll over, so as to avoid the adverse affects that may result from deploying a safety restraint actuator(s) 30 after head closure.

In accordance with one mode of operation, responsive to the detection of a roll event by either the measures algorithm 300.1 or the energy algorithm 300.2, as confirmed by the safing algorithm 200, the occupant detection system 42 provides for disabling the actuation of the associated left 30.1 or right 30.2 safety restraint actuator(s) if an occupant is not present on the left or right side to which the vehicle is rolling. For example, if there were no passenger on the right side of the vehicle 12, and if the vehicle 12 were to roll to the right, then responsive to the input from the left 56.1 occupant sensor(s) indicating that no occupant 44 was present in the left seating location, then the processor 26 would not actuate the left 30.1 safety restraint actuator(s) responsive to the roll, so as to avoid any potential adverse affects, e.g. repair costs, of unnecessarily deploying the left 30.1 safety restraint actuator(s).

In accordance with another mode of operation, the timing of the actuation of the safety restraint actuator(s) 30 can be adapted responsive to either the distance of the occupant 44 from the associated inner boundary 46 of the vehicle 12, or responsive to a projected head or torso closure time, which is in turn responsive to sensed occupant kinematics. For example, responsive to a measure of occupant position from the occupant detection system 42—or a prediction of occupant position therefrom,—the actuation of the safety restraint actuator(s) 30 could either be inhibited; or delayed or advanced relative to the time at which the roll event would otherwise be detected.

For example, the deployment of some or all safety restraint actuator(s) 30 could be delayed until head/body closure with the associated inner boundary 46 of the vehicle 12 was imminent (on the order of 10-30 milliseconds before contact, depending upon how long the associated safety restraint actuator(s) 30 might require to be substantially deployed; i.e. if the head or torso closure time is greater than the deployment time of the associated safety restraint actuator(s) 30), thereby providing the rollover detection system 10.1 as much time as possible to determine or best predict if the event will lead to complete vehicle rollover. Basing the deployment decision upon occupant position or head closure would thereby provide the maximum amount of time for the rollover detection system 10.1 to evaluate the associated acceleration and angular velocity measurements in order to better differentiate roll from non-roll events.

As another example, the deployment of some or all safety restraint actuator(s) 30 could be expedited if imminent head closure were either detected or anticipated by the occupant detection system 42 (e.g. if the head/torso closure time were less than or equal to the deployment time of the associated safety restraint actuator(s) 30), by reducing one or more associated thresholds of either the measures algorithm 300.1, the energy algorithm 300.2, or the safing algorithm 200 to a lower—but still significant—level. For example, if imminent head closure were either detected or anticipated by the occupant detection system 42, then some or all safety restraint actuator(s) 30 might be deployed if a set of minimum conditions were satisfied, e.g. if the angular velocity were to have exceeded an associated minimum threshold, e.g. on the order of 60 degrees/second; if the roll angle were to exceed an associated minimum threshold, e.g. 10 degrees; and/or if the lateral acceleration were to have exceeded an associated minimum threshold, e.g. (at least 1 g for at least 10 milliseconds). As another example, one or both of the associated threshold functions illustrated in FIGS. 12 and 15 for the measures 300.1 and energy 300.2 algorithms respectively could be reduced—relative those for a system without an occupant detection system 42—if imminent head closure were either detected or anticipated by the occupant detection system 42. These thresholds can be further adjusted according to the measured rate of occupant head closure so that lower thresholds are provide responsive to faster lateral head speeds. Upon recognition of imminent head closure and after transcending these lesser thresholds, any restraints that may be reset or reused would be most likely to be deployed. Alternatively, all rollover restraints, including airbags could be deployed just in time to prevent a first impact between the occupant's head and the associated inner boundary 46 of the vehicle 12. Occupant lateral motion provides an additional indication that a potential rollover event is in progress and may even be relied upon as rollover safing measure independent of other sensed signals such as roll rate.

As another example, if the decision to deploy the safety restraint actuator(s) 30 is not made until after a head or torso closure was detected by the occupant detection system 42, then the safety restraint actuator(s) 30 could be selectively deployed depending upon occupant position. For example, either the seat belt pretensioners 32.1, 32.2 or overhead air bag inflator 40.1, 40.2 could be immediately deployed, since these would be relatively benign to an occupant positioned against the associated inner boundary 46 of the vehicle 12. However, the decision to deploy a roll curtain 38.1, 38.2 or thorax air bag inflator 36.1, 36.2 would be delayed until the occupant position provided for an opportunity to properly deploy the bag between the occupant 44 and the associated inner boundary 46 of the vehicle 12, so as to enhance protection for the occupant 44 while preventing the occupant 44 from being situated between a restraint of a safety restraint actuator 30 and the vehicle door 64.1, 64.2 or side window 39.1, 39.2.

The parameters of the herein-described roll discrimination algorithm are derived from associated test data, and may require adjustment if applied to other types of vehicles than for those for which the parameters were derived, wherein a criteria for the adjustment is, for example, robust and early detection of rollover events while also avoiding, to the extent possible, falsely discriminating non-rollover events as rollover events. The particular values for various parameters described herein are not considered to be limiting, and for example may be different for different types of vehicles, which may have different susceptibilities to rollover. For example, a vehicle with a relatively high center of gravity or a relatively narrow wheel-base—e.g. a sport-utility vehicle—would be more susceptible to rollover than a vehicle having a relatively low center of gravity or a relatively wide wheelbase—e.g. a passenger sedan. Furthermore, the rollover detection system 10 as could also be adapted to sense pitchover events, i.e. about the local Y-axis of the vehicle, by providing an associated longitudinal accelerometer and a pitch rate sensor.

The occupant sensor provides for an improved rollover detection system by providing for modifying the deployment of the safety restraint system responsive to either occupant presence, position, estimated closure time or closure velocity, so as to reduce the prospects for occupant injury either responsive to a rollover event, or responsive to the deployment of the associated safety restraint system.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims, and any and all equivalents thereof.

We claim:

1. A system for detecting a rollover condition of a vehicle, comprising:
   a. a roll angular velocity sensor operatively coupled to the vehicle, wherein said roll angular velocity sensor is configured to measure a roll rate of the vehicle about a roll axis, and said roll axis is substantially aligned with a longitudinal axis of the vehicle;
   b. an occupant sensor responsive to a presence or position of an occupant in the vehicle, wherein said occupant sensor provides a measure of proximity or position to an inner boundary of the vehicle; and
   c. a processor operatively coupled to said roll angular velocity sensor and to said occupant sensor, wherein said processor is configured to generate a signal for controlling a safety restraint system, said signal for controlling said safety restraint system is responsive to a detection of a prospective rollover condition responsive to a signal from said roll angular velocity sensor, and said processor is configured to modify either one or more detection criteria associated with said signal for controlling said safety restraint system or a timing of an associated actuation signal, wherein said one or more detection criteria or said timing is or are modified responsive to a signal from said occupant sensor, and said detection criteria comprises a threshold associated with a rollover detection algorithm.

2. A system for detecting a rollover condition of a vehicle as recited in claim 1, wherein said occupant sensor is responsive to a position of the head of the occupant.

3. A system for detecting a rollover condition of a vehicle as recited in claim 1, wherein said occupant sensor is responsive to a position of the torso of the occupant.

4. A system for detecting a rollover condition of a vehicle as recited in claim 1, wherein said occupant sensor comprises at least one sensor selected from a capacitive sensor, an active infrared sensor, a passive infrared sensor, a vision sensor, a laser sensor, an optical sensor, a radar sensor, a microwave senor, a sound wave sensor, a multi-point seat weight distribution sensor, and an electric field sensor.

5. A system for detecting a rollover condition of a vehicle as recited in claim 1, wherein said processor is adapted to determine a measure of roll angle by integrating said signal from said roll angular velocity sensor, and said signal for controlling said safety restraint system is further responsive to said measure of roll angle.

6. A system for detecting a rollover condition of a vehicle as recited in claim 1, further comprising an accelerometer operatively coupled to the vehicle, wherein said accelerometer is adapted to measure an acceleration of the vehicle substantially in said lateral direction, and said signal for controlling said safety restraint system is further responsive to a signal from said accelerometer.

7. A method of providing for detecting a rollover condition of a vehicle, comprising:
   a. providing for acquiring a measure of roll angular velocity of the vehicle about a roll axis, wherein said roll axis is substantially aligned with a longitudinal axis of the vehicle;
   b. providing for acquiring a measure of occupant position in the vehicle; and
   c. providing for generating a signal for controlling a safety restraint system, wherein said signal for controlling said safety restraint system is responsive to said measure of roll angular velocity and to at least one detection criteria; and
   d. providing for modifying either said at least one detection criteria associated with said signal for controlling said safety restraint system or a timing of an associated actuation signal responsive to said measure of occupant position, wherein said at least one detection criteria comprises at least one threshold associated with a corresponding at least one rollover detection algorithm.

8. A method of providing for detecting a rollover condition of a vehicle, comprising:
   a. providing for acquiring a measure of roll angular velocity of the vehicle about a roll axis, wherein said roll axis is substantially aligned with a longitudinal axis of the vehicle;
   b. providing for acquiring a measure of occupant position in the vehicle; and
   c. providing for generating a signal for controlling a safety restraint system, wherein said signal for controlling said safety restraint system is responsive to said measure of roll angular velocity and to a detection criteria, said detection criteria is responsive to said measure of occupant position, and a deployment threshold associated with said detection criteria is shifted by an offset responsive to said measure of occupant position.

9. A method of providing for detecting a rollover condition of a vehicle, comprising:
   a. providing for acquiring a measure of roll angular velocity of the vehicle about a roll axis, wherein said roll axis is substantially aligned with a longitudinal axis of the vehicle;
   b. providing for acquiring a measure of occupant position in the vehicle; and
   c. providing for generating a signal for controlling a safety restraint system, wherein said signal for controlling said safety restraint system is responsive to said measure of roll angular velocity and to a detection criteria, said detection criteria is responsive to said measure of occupant position, and a deployment threshold associated with said detection criteria is scaled by a factor responsive to said measure of occupant position.

10. A method of providing for detecting a rollover condition of a vehicle, comprising:
   a. providing for acquiring a measure of roll angular velocity of the vehicle about a roll axis, wherein said roll axis is substantially aligned with a longitudinal axis of the vehicle;
   b. providing for acquiring a measure of occupant position in the vehicle; and
   c. providing for generating a signal for controlling a safety restraint system, wherein said signal for controlling said safety restraint system is responsive to said measure of roll angular velocity and to a detection criteria, said detection criteria is responsive to said measure of occupant position, and a deployment threshold associated with said detection criteria is responsive to a rate of change of said measure of occupant position.

11. A method of providing for detecting a rollover condition of a vehicle, comprising:
   a. providing for acquiring a measure of roll angular velocity of the vehicle about a roll axis, wherein said roll axis is substantially aligned with a longitudinal axis of the vehicle;
   b. providing for acquiring a measure of occupant position in the vehicle;
   c. providing for generating a signal for controlling a safety restraint system, wherein said signal for controlling said safety restraint system is responsive to said measure of roll angular velocity and to a detection criteria, and said detection criteria is responsive to said measure of occupant position;
   d. providing for determining or acquiring a measure of roll angle from said measure of roll angular velocity;
   e. providing for determining a threshold function in a phase space of said measure of roll angular velocity and said measure of roll angle;
   f. providing for modifying said threshold function responsive to said measure of occupant position; and
   g. providing for comparing a measure in phase space with said threshold function, wherein said measure in phase space comprises a combination of said measure of roll angular velocity and said measure of roll angle, wherein said signal for controlling said safety restraint system is responsive to the operation of comparing said measure in phase space with said threshold function.

12. A method of providing for detecting a rollover condition of a vehicle as recited in claim 11, wherein said threshold function comprises either a function in phase space, a piecewise function in phase space, or a table lookup in phase space.

13. A method of providing for detecting a rollover condition of a vehicle as recited in claim 11, wherein the operation of modifying said threshold function comprises determining a roll angular velocity offset responsive to said measure of occupant position, and subtracting said roll angular velocity offset from said threshold function.

14. A method of providing for detecting a rollover condition of a vehicle, comprising:
   a. providing for acquiring a measure of roll angular velocity of the vehicle about a roll axis, wherein said roll axis is substantially aligned with a longitudinal axis of the vehicle;
   b. providing for acquiring a measure of occupant position in the vehicle; and
   c. providing for generating a signal for controlling a safety restraint system, wherein said signal for controlling said safety restraint system is responsive to said measure of roll angular velocity and to a detection criteria, and said detection criteria is responsive to said measure of occupant position, wherein the operation of providing for generating said signal for controlling said safety restraint system comprises:
      i. providing for acquiring a measure of lateral acceleration of the vehicle;
      ii. providing for determining a figure of merit responsive to said measure of lateral acceleration and said measure of roll angular velocity;
      iii. providing for determining a figure of merit threshold responsive to said measure of occupant position; and
      iv. providing for detecting the rollover condition by comparing said figure of merit with said figure of merit threshold.

15. A method of providing for detecting a rollover condition of a vehicle, comprising:
   a. providing for acquiring a measure of roll angular velocity of the vehicle about a roll axis, wherein said roll axis is substantially aligned with a longitudinal axis of the vehicle;
   b. providing for acquiring a measure of occupant position in the vehicle;
   c. providing for generating a signal for controlling a safety restraint system, wherein said signal for controlling said safety restraint system is responsive to said measure of roll angular velocity and to a detection criteria, and said detection criteria is responsive to said measure of occupant position;
   d. providing for estimating a closure time at which at least a portion of the occupant will contact an interior portion of the vehicle;
   e. providing for comparing said closure time with a first threshold, wherein said first threshold corresponds to a time period that is necessary to deploy said safety restraint system prior to interaction therewith by the occupant; and
   f. providing for adapting said signal for controlling said safety restraint system responsive to the operation of comparing said closure time with said first threshold.

16. A method of providing for detecting a rollover condition of a vehicle as recited in claim 15, wherein the operation of estimating said closure time comprises estimating or measuring a velocity of the occupant relative to the vehicle.

17. A method of providing for detecting a rollover condition of a vehicle as recited in claim 15, further comprising storing said measure of occupant position at different times, wherein the operation of estimating said closure time comprises estimating or measuring an acceleration of the occupant relative to the vehicle.

18. A method of providing for detecting a rollover condition of a vehicle as recited in claim 15, wherein the operation of estimating said closure time is responsive to a plurality of measures of occupant position at respective different times.

19. A method of providing for detecting a rollover condition of a vehicle as recited in claim 15, wherein if said closure time is less than said first threshold, then further comprising modifying said signal for controlling said safety restraint system.

20. A method of providing for detecting a rollover condition of a vehicle as recited in claim 19, wherein the operation of modifying said signal for controlling said safety restraint system comprises causing said safety restraint system to deploy sooner than would otherwise occur responsive to a detection of a prospective rollover condition.

21. A method of providing for detecting a rollover condition of a vehicle as recited in claim 19, wherein the operation of modifying said signal for controlling said safety restraint system comprises inhibiting a deployment of said safety restraint system.

22. A method of providing for detecting a rollover condition of a vehicle as recited in claim 19, wherein the operation of modifying said signal for controlling said safety restraint system comprises delaying a deployment of said safety restraint system.

23. A method of providing for detecting a rollover condition of a vehicle as recited in claim 22, wherein the operation of delaying said deployment of said safety restraint system comprises delaying said deployment until a difference between said closure time and said first threshold is less than a second threshold.

* * * * *